US012127168B2

(12) United States Patent
Zhang

(10) Patent No.: US 12,127,168 B2
(45) Date of Patent: Oct. 22, 2024

(54) METHOD AND DEVICE USED IN NODE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 494 days.

(21) Appl. No.: 17/365,980

(22) Filed: Jul. 1, 2021

(65) Prior Publication Data
US 2021/0329612 A1 Oct. 21, 2021

Related U.S. Application Data

(63) Continuation of application No. PCT/CN2019/128784, filed on Dec. 26, 2019.

(30) Foreign Application Priority Data

Jan. 2, 2019 (CN) .......................... 201910000607.2

(51) Int. Cl.
H04W 72/044 (2023.01)
H04L 1/00 (2006.01)
H04W 74/0833 (2024.01)

(52) U.S. Cl.
CPC ......... *H04W 72/044* (2013.01); *H04L 1/0003* (2013.01); *H04L 1/0009* (2013.01); *H04W 74/0833* (2013.01)

(58) Field of Classification Search
None
See application file for complete search history.

(56) References Cited

U.S. PATENT DOCUMENTS

2009/0175253 A1* 7/2009 Wu .................. H04W 99/00 370/338
2011/0164597 A1 7/2011 Amini
(Continued)

FOREIGN PATENT DOCUMENTS

| CN | 101473585 A | 7/2009 |
| CN | 102333376 A | 1/2012 |

(Continued)

OTHER PUBLICATIONS

CN201910000607.2 Notification to Grant Patent Right for Invention dated Mar. 8, 2021.
(Continued)

*Primary Examiner* — Christopher T Wyllie

(57) ABSTRACT

The present disclosure provides a method and device used in node for wireless communication. A first node transmits a first sequence and a first radio signal; receives a first signaling; and receives a second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively. By interpreting the existing signaling in a new way, the method provided in the (Continued)

present disclosure prevents unnecessary signaling overhead and meanwhile supports a flexible switch between 2-step random access and 4-step random access.

20 Claims, 6 Drawing Sheets

(56) References Cited

U.S. PATENT DOCUMENTS

| | | | |
|---|---|---|---|
| 2017/0099660 A1* | 4/2017 | Oh | H04L 5/0064 |
| 2019/0140776 A1* | 5/2019 | Seo | H04B 7/0456 |
| 2020/0146054 A1* | 5/2020 | Jeon | H04W 74/0833 |
| 2021/0329612 A1* | 10/2021 | Zhang | H04L 1/0009 |
| 2024/0073103 A1* | 2/2024 | Arends | H04L 67/141 |

FOREIGN PATENT DOCUMENTS

| | | |
|---|---|---|
| CN | 103907298 A | 7/2014 |
| CN | 107343297 A | 11/2017 |
| CN | 107404369 A | 11/2017 |
| CN | 111385905 A | 7/2020 |
| WO | 2018145585 A1 | 8/2018 |

OTHER PUBLICATIONS

CN201910000607.2 First Office Action dated Nov. 17, 2020.
CN201910000607.2 First Search Report dated Nov. 6, 2020.
ISR in application PCT/CN2019/128784 dated Feb. 26, 2020.
Intel Corporation."R1-1902467,Procedure for Two-Step RACH" 3GPP TSGRAN WG1 #96,Mar. 1, 2019 (Mar. 1, 2019),section 2.
CMCC."R1-1906512,Discussion on Procedure for 2-step RACH" 3GPP TSGRAN WG1 #97.May 17, 2019 (May 17, 2019),section 2.
CATT."R2-1700205, Consideration on 2-Step RA" 3GPPTSGRANWG2 Meeting Ad Hoc;,Jan. 19, 2017(Jan. 19, 2017) sections 2.1 and 2.3.
Samsung."R1-1612468,Discussion on Simplified RACH Procedure" 3GPPTSGRAN WG1 Meeting#87.Nov. 18, 2016(Nov. 18, 2016).entire document.
R1. LTE—The UMTS Long Term Evolution From Theory to Practice (Second Edition), Print ISBN: 9780470660256 (H/B), Stefania Sesia, etc.

* cited by examiner first information format second information format

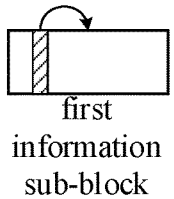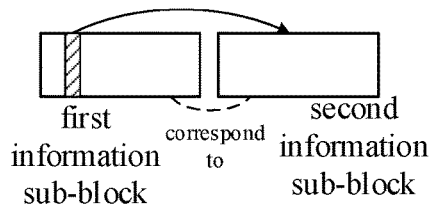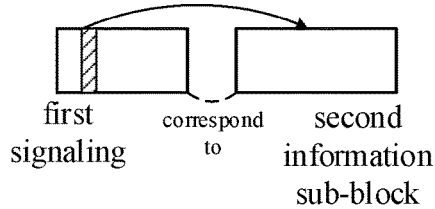
FIG. 10
FIG. 11
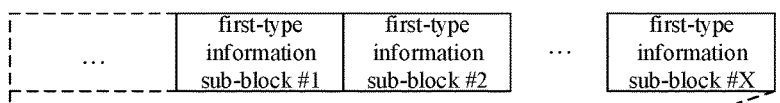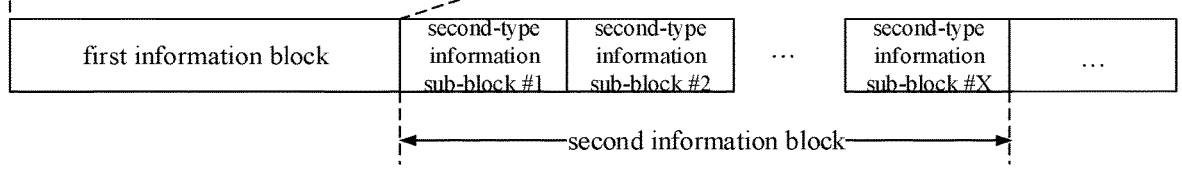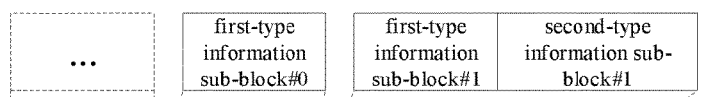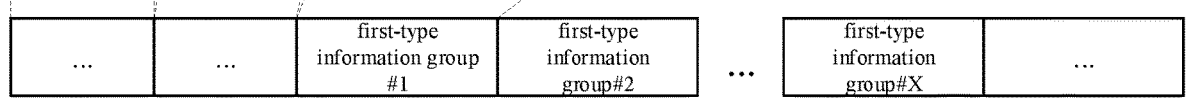
FIG. 12

METHOD AND DEVICE USED IN NODE FOR WIRELESS COMMUNICATION

CROSS REFERENCE TO RELATED APPLICATIONS

This application is a continuation of International Application No. PCT/CN2019/128784, filed Dec. 26, 2019, claims the priority benefit of Chinese Patent Application No. 201910000607.2, filed on Jan. 2, 2019, the full disclosure of which is incorporated herein by reference.

BACKGROUND

Technical Field

The present disclosure relates to transmission methods and devices in wireless communication systems, and in particular to a scheme and device of random-access related transmission in wireless communication.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

To ensure better adaptability to various application scenarios and satisfy different requests, a study item (SI) of Non-orthogonal Multiple Access (NoMA) under NR was approved at the 3GPP RAN #76 Plenary. The SI was started with the Release 16 version, and soon after its completion, a Work Item (WI) was initiated to standardize relevant techniques. To carry on the NoMA SI, a WI of 2-step RACH of NR was approved on the 3GPP RAN #82 Plenary meeting.

SUMMARY

Both the traditional 4-step random access procedure and the current 2-step random access procedure can be applied for a User Equipment (UE) of the Release 16 and later versions. According to requirements of the WI of 2-step random access, a UE can switch between 2-step random access and 4-step random access or fall back from 2-step random access to 4-step random access. By providing a method of deciphering by reusing the existing signaling, the present disclosure figures out a solution to indicate the signaling format of a MsgB for 2-step random access and a Msg2 for 4-step random access (Random Access Response, i.e., RAR). It should be noted that if no conflict is incurred, the embodiments of the base station in the present disclosure and the characteristics of the embodiments can be applied to a UE, and vice versa. And the embodiments in the present disclosure and the characteristics of the embodiments can be arbitrarily combined if there is no conflict.

The present disclosure provides a method in a first node for wireless communication, comprising:
 transmitting a first sequence and a first radio signal, the first sequence being used to determine a time-frequency resource occupied by the first radio signal;
 receiving a first signaling; and
 receiving a second radio signal, the first signaling being used to determine at least one of a time-frequency resource occupied by the second radio signal or a Modulation and Coding Scheme (MCS) adopted by the second radio signal;
 herein, the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the first node determines that it is a MsgB of 2-step random access that is comprised by the second information block, or that it is a Msg2 of 4-step random access that is comprised by the second information block through re-interpreting a first field in the first information block in the present disclosure.

In one embodiment, the first node determines whether a first field in the first information sub-block in the present disclosure is used for determining an information format of the second information sub-block in the present disclosure according to a position of the first information sub-block in X first-type information sub-block(s).

In one embodiment, an advantage of the above method lies in that the reinterpretation of the present signaling helps prevent extra signaling overhead and supports a flexible shift between 2-step random access and 4-step random access.

According to one aspect of the present disclosure, the above method is characterized in comprising:
 receiving a third information block;
 herein, the third information block is used to determine a time length of a first time window; a time-domain resource occupied by the first signaling belongs to the first time window, at least one of a radio resource occupied by the first sequence or a radio resource occupied by the first radio signal is used to determine a start of the first time window.

According to one aspect of the present disclosure, the above method is characterized in that the first information block comprises X first-type information sub-block(s), and the X first-type information sub-block(s) is(are respectively) used to determine the X characteristic sequence(s); a first information sub-block is one of the X first-type information sub-block(s); the first information sub-block is used to determine the first sequence; the first information sub-block comprises a first field, the first field being used to determine an information format of a second-type information sub-block of the X second-type information sub-block(s) that corresponds to the first sequence.

According to one aspect of the present disclosure, the above method is characterized in that for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the at least one characteristic sequence.

According to one aspect of the present disclosure, the above method is characterized in that the first signaling comprises a second field, the second field being used to indicate an information format of a second-type information sub-block of the X second-type information sub-block(s) that corresponds to the first sequence; or, a first bit block is used to generate the first signaling, and the number of bits comprised in the first bit block is used to determine an information format of a second-type information sub-block of the X second-type information sub-block(s) that corresponds to the first sequence.

According to one aspect of the present disclosure, the above method is characterized in that a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block.

According to one aspect of the present disclosure, the above method is characterized in that the first node is a UE.

According to one aspect of the present disclosure, the above method is characterized in that the first node is a relay node.

The present disclosure provides a method in a second node for wireless communication, comprising:
- receiving a first sequence and a first radio signal, the first sequence being used to determine a time-frequency resource occupied by the first radio signal;
- transmitting a first signaling; and
- transmitting a second radio signal, the first signaling being used to determine at least one of a time-frequency resource occupied by the second radio signal or a Modulation and Coding Scheme (MCS) adopted by the second radio signal;
- herein, the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

According to one aspect of the present disclosure, the above method is characterized in comprising:
- transmitting a third information block;
- herein, the third information block is used to determine a time length of a first time window; a time-domain resource occupied by the first signaling belongs to the first time window, at least one of a radio resource occupied by the first sequence or a radio resource occupied by the first radio signal is used to determine a start of the first time window.

According to one aspect of the present disclosure, the above method is characterized in that the first information block comprises X first-type information sub-block(s), and the X first-type information sub-block(s) is(are respectively) used to determine the X characteristic sequence(s); a first information sub-block is one of the X first-type information sub-block(s); the first information sub-block is used to determine the first sequence; the first information sub-block comprises a first field, the first field being used to determine an information format of a second-type information sub-block of the X second-type information sub-block(s) that corresponds to the first sequence.

According to one aspect of the present disclosure, the above method is characterized in that for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the at least one characteristic sequence.

According to one aspect of the present disclosure, the above method is characterized in that the first signaling comprises a second field, the second field being used to indicate an information format of a second-type information sub-block of the X second-type information sub-block(s) that corresponds to the first sequence; or, a first bit block is used to generate the first signaling, and the number of bits comprised in the first bit block is used to determine an information format of a second-type information sub-block of the X second-type information sub-block(s) that corresponds to the first sequence.

According to one aspect of the present disclosure, the above method is characterized in that a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block.

According to one aspect of the present disclosure, the above method is characterized in that the second node is a base station.

According to one aspect of the present disclosure, the above method is characterized in that the second node is a relay node.

The present disclosure provides a first node for wireless communication, comprising:
- a first transmitter, transmitting a first sequence and a first radio signal, the first sequence being used to determine a time-frequency resource occupied by the first radio signal; and
- a first receiver, receiving a first signaling;
- the first receiver, receiving a second radio signal, the first signaling being used to determine at least one of a time-frequency resource occupied by the second radio signal or a Modulation and Coding Scheme (MCS) adopted by the second radio signal;

herein, the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

The present disclosure provides a second node for wireless communication, comprising:

a third receiver, receiving a first sequence and a first radio signal, the first sequence being used to determine a time-frequency resource occupied by the first radio signal; and a second transmitter, transmitting a first signaling;

the second transmitter, transmitting a second radio signal, the first signaling being used to determine at least one of a time-frequency resource occupied by the second radio signal or a Modulation and Coding Scheme (MCS) adopted by the second radio signal;

herein, the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the present disclosure has the following advantages:

The present disclosure makes a reinterpretation of a first field in the first information block, which determines that the second information block in the present disclosure comprises a MsgB of 2-step random access, or that the second information block in the present disclosure comprises a Msg2 of 4-step random access.

The present disclosure determines according to the position of the first information sub-block in X first-type information sub-block(s) whether the first field in the first information sub-block is used for determining the information format of the second information sub-block in the present disclosure.

With a new deciphering of the current signaling, the present disclosure prevents extra signaling overhead and supports the flexible shift between 2-step random access and 4-step random access.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram of relations between a first field, a first information sub-block and a second information sub-block according to one embodiment of the present disclosure.

FIG. 11 illustrates a schematic diagram of relations between a second field, a first signaling and a second information sub-block according to one embodiment of the present disclosure.

FIG. 12 illustrates a schematic diagram of a relationship between a first information block and a second information block according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
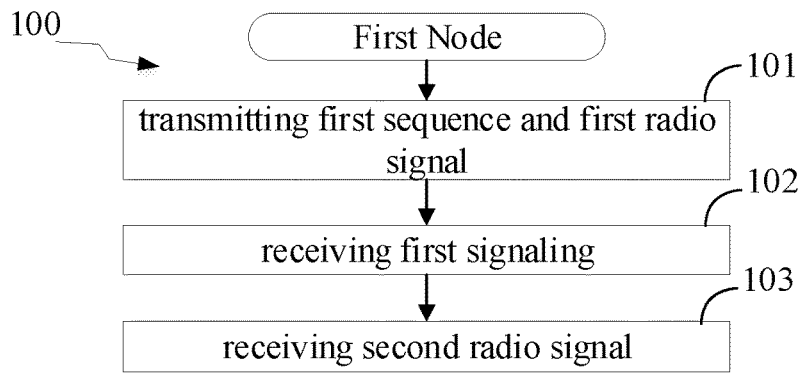
FIG. 1 illustrates a flowchart of processing of a first node according to one embodiment of the present disclosure.

Embodiment 1 illustrates a flowchart of processing of a first node, as shown in FIG. 1. In 100 illustrated by the figure, each box represents a step. In Embodiment 1, the first node in the present disclosure first takes step 101 to transmit a first sequence and a first radio signal; and then takes step 102 to receive a first signaling; and then takes step 103 to receive a second radio signal; the first sequence is used to determine a time-frequency resource occupied by the first radio signal; the first signaling is used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the first sequence is transmitted on a Random Access Channel (RACH).

In one embodiment, the first sequence is transmitted on a Physical Random Access Channel (PRACH).

In one embodiment, the first sequence is transmitted on a Narrowband Physical Random Access Channel (NPRACH).

In one embodiment, the first sequence is Cell-specific.

In one embodiment, the first sequence is UE-specific.

In one embodiment, the first sequence is Broadcast.

In one embodiment, the first sequence is Groupcast.

In one embodiment, the first sequence is Unicast.

In one embodiment, the first sequence is a pseudo-random sequence.

In one embodiment, the first sequence is a Gold sequence.

In one embodiment, the first sequence is a M sequence.

In one embodiment, the first sequence is a Zadeoff-Chu sequence.

In one embodiment, the first sequence is a Preamble.

In one embodiment, the way of generating the first sequence refers to 3GPP TS38.211, section 6.3.3.1.

In one embodiment, a subcarrier spacing (SCS) of subcarriers occupied by the first sequence in frequency domain is one of 1.25 kHz, 5 kHz, 15 kHz, 30 kHz, 60 kHz or 120 kHz.

In one embodiment, the first sequence is a Long Preamble.

In one embodiment, the first sequence is a Short Preamble.

In one embodiment, the first sequence is of a length of 839, and an SCS of subcarriers occupied by the first sequence is either of 1.25 kHz and 5 kHz.

In one embodiment, the first sequence is of a length of 139, and an SCS of subcarriers occupied by the first sequence is one of 15 kHz, 30 kHz, 60 kHz or 120 kHz.

In one embodiment, the first sequence comprises a positive integer number of first-type sub-sequence(s), each one of the positive integer number of first-type sub-sequence(s) is a Zadeoff-Chu sequence, and each one of the positive integer number of first-type sub-sequence(s) is of a length of 139, the positive integer number of first-type sub-sequence(s) being Time-Division Multiplexing (TDM).

In one embodiment, the positive integer number of first-type sub-sequences are identical.

In one embodiment, at least two of the positive integer number of first-type sub-sequences are different.

In one embodiment, the first sequence is first through Discrete Fourier Transform (DFT) and then Orthogonal Frequency Division Multiplexing (OFDM) modulation processing.

In one embodiment, a first characteristic radio signal is obtained by the first sequence first through Sequence Generation, Discrete Fourier Transform (DFT) and Modulation, and then Resource Element Mapping, and finally Wideband Symbol Generation.

In one embodiment, the first characteristic radio signal is transmitted on a RACH.

In one embodiment, the first characteristic radio signal is transmitted on a PRACH.

In one embodiment, the first characteristic radio signal is transmitted on a NPRACH.

In one embodiment, there is at least one random access occasion, and for one of the at least one occasion, there is at least one characteristic sequence.

In one embodiment, any of the X0 characteristic sequence(s) is a pseudo-random sequence.

In one embodiment, any of the X0 characteristic sequence(s) is a Zadeoff-Chu sequence.

In one embodiment, X0 is a positive integer no greater than 64.

In one embodiment, X0 is equal to 64.

In one embodiment, at least one of the X0 characteristic sequence(s) is transmitted on one of the random access occasion(s).

In one embodiment, the first sequence is a characteristic sequence of the X0 characteristic sequence(s).

In one embodiment, the random access occasion is time-frequency resources occupied by the X0 characteristic sequence(s).

In one embodiment, the random access occasion is a time-frequency resource occupied by the first sequence.

In one embodiment, the first characteristic radio signal is transmitted on one of the random access occasion(s).

In one embodiment, the random access occasion is a time-frequency PRACH occasion.

In one embodiment, an SCS of subcarriers occupied by any of the X0 characteristic sequence(s) in frequency domain is one of 1.25 kHz, 5 kHz, 15 kHz, 30 kHz, 60 kHz or 120 kHz.

In one embodiment, any of the X0 characteristic sequence(s) is a Long Preamble.

In one embodiment, any of the X0 characteristic sequence(s) is a Short Preamble.

In one embodiment, a first given characteristic sequence is a characteristic sequence of the X0 characteristic sequence(s), the first given characteristic sequence is of a length of 839, and an SCS of subcarriers occupied by the first given characteristic sequence is either of 1.25 kHz and 5 kHz.

In one embodiment, a second given characteristic sequence is a characteristic sequence of the X0 characteristic sequence(s), the second given characteristic sequence is of a length of 139, and an SCS of subcarriers occupied by the second given characteristic sequence is one of 15 kHz, 30 kHz, 60 kHz and 120 kHz.

In one embodiment, the second given characteristic sequence comprises a positive integer number of second-type sub-sequence(s), each of the positive integer number of second-type sub-sequence(s) is a Zadeoff-Chu sequence, and each of the positive integer number of second-type sub-sequence(s) is of a length of 139, the positive integer number of second-type sub-sequence(s) being TDM.

In one embodiment, the positive integer number of second-type sub-sequences are identical.

In one embodiment, at least two of the positive integer number of second-type sub-sequences are different.

In one embodiment, any of the X0 characteristic sequence(s) is first through Discrete Fourier Transform (DFT) and then OFDM modulation processing.

In one embodiment, any of the X0 characteristic sequence(s) is first through Sequence Generation, DFT and Modulation, and then Resource Element Mapping, and finally Wideband Symbol Generation.

In one embodiment, the X0 characteristic sequence(s) corresponds(correspond) to X0 characteristic sequence identifier(s) respectively.

In one embodiment, any of the X0 characteristic sequence identifier(s) is a non-negative integer.

In one embodiment, any of the X0 characteristic sequence identifier(s) is a Random Access Preamble Identifier (RAPID).

In one embodiment, the X0 characteristic sequence identifiers are 0, 1, 2 . . . and X0-1, respectively.

In one embodiment, the X0 characteristic sequence identifiers are 1, 2, 3 . . . and X0, respectively.

In one embodiment, any of the X0 characteristic sequence identifier(s) is an integer of 0 through X0-1.

In one embodiment, any of the X0 characteristic sequence identifier(s) is a positive integer between 1 and X0.

In one embodiment, any of the X0 characteristic sequence identifier(s) is an integer of 0 through 63.

In one embodiment, any of the X0 characteristic sequence identifier(s) is a positive integer between 1 and 64.

In one embodiment, a first sequence identifier is one of the X0 characteristic sequence identifier(s) corresponding to the first sequence.

In one embodiment, the first sequence identifier is used to determine the first sequence.

In one embodiment, the first sequence identifier is used to determine the first sequence out of the X0 characteristic sequence(s).

In one embodiment, the first sequence identifier is used to indicate the first sequence.

In one embodiment, the first sequence identifier is a RAPID.

In one embodiment, the first sequence identifier is an integer between 0 and 63.

In one embodiment, the first sequence identifier is a positive integer between 1 and 64.

In one embodiment, the first radio signal is transmitted on an Uplink Shared Channel (UL-SCH).

In one embodiment, the first radio signal is transmitted on a PUSCH.

In one embodiment, the first radio signal is transmitted on a PSSCH.

In one embodiment, the first radio signal is transmitted on a PUCCH.

In one embodiment, the first radio signal is transmitted on a PSCCH.

In one embodiment, the first radio signal is transmitted on a PUCCH and a PUSCH.

In one embodiment, the first radio signal is transmitted on a PSCCH and a PSSCH.

In one embodiment, the first sequence and the first radio signal are respectively transmitted on a PRACH and a PUSCH.

In one embodiment, the first radio signal is cell-specific.

In one embodiment, the first radio signal is UE-specific.

In one embodiment, the first sequence is cell-specific, while the first radio signal is UE-specific.

In one embodiment, the first radio signal is transmitted by broadcast.

In one embodiment, the first radio signal is transmitted by groupcast.

In one embodiment, the first radio signal is transmitted by unicast.

In one embodiment, the first radio signal comprises all or part of a higher layer signaling.

In one embodiment, the first radio signal comprises all or part of a Radio Resource Control (RRC) layer signaling.

In one embodiment, the first radio signal comprises one or more fields of an RRC Information Element (IE).

In one embodiment, the first radio signal comprises all or part of a Multimedia Access Control (MAC) layer signaling.

In one embodiment, the first radio signal comprises one or more fields of a MAC Control Element (CE).

In one embodiment, the first radio signal comprises one or more fields of a Physical (PHY) layer.

In one embodiment, the first radio signal comprises one or more fields of a piece of Uplink Control Information (UCI).

In one embodiment, the first radio signal comprises one or more fields of a Master Information Block-V2X-Sidelink (MIB-V2X-SL).

In one embodiment, the first radio signal comprises one or more fields of a piece of Sidelink Control Information (SCI).

In one embodiment, the first radio signal comprises a second bit block, the second bit block comprising a positive integer number of sequentially arranged bits.

In one embodiment, the second bit block comprises a positive integer number of Code Block(s) (CB(s)).

In one embodiment, the second bit block comprises a positive integer number of Code Block Group(s) (CBG(s)).

In one embodiment, the second bit block comprises a Transport Block (TB).

In one embodiment, the second bit block is obtained by a TB through TB-level CRC Attachment.

In one embodiment, the second bit block is a CB of Code Blocks obtained by a TB through TB-level CRC Attachment, Code Block Segmentation and CB-level CRC Attachment in sequence.

In one embodiment, the first radio signal is obtained by all or part of bits in the second bit block sequentially through TB-level CRC Attachment, Code Block Segmentation and CB-level CRC Attachment, Channel Coding, Rate Matching, Code Block Concatenation, Scrambling, Modulation, Layer Mapping and Antenna Port Mapping, Mapping to Physical Resource Blocks, and Baseband Signal Generation, Modulation and Upconversion.

In one embodiment, the Channel Coding is based on a polar code.

In one embodiment, the Channel Coding is based on a Low-density Parity-Check (LDPC) code.

In one embodiment, only the second bit block is used for generating the first radio signal.

In one embodiment, there is a Code Block other than the second bit block being used for generating the first radio signal.

In one embodiment, the first radio signal does not comprise UCI.

In one embodiment, the first radio signal does not comprise SCI.

In one embodiment, an SCS of subcarriers occupied by the first radio signal in frequency domain is one of 15 kHz, 30 kHz, 60 kHz, 120 kHz, 240 kHz, 480 kHz or 960 kHz.

In one embodiment, a number of multicarrier symbol(s) comprised by the first radio signal in time domain is one of 1, 2, 3, 4, 5, 6, 7, 11, 12, 13 and 14.

In one embodiment, the first sequence and the first radio signal are TDM.

In one embodiment, the first characteristic radio signal and the first radio signal are TDM.

In one embodiment, a time-frequency resource occupied by the first radio signal is related to the first sequence.

In one embodiment, the first sequence is used to determine a first time-frequency resource pool, the first time-frequency resource pool comprises a positive integer number of time-frequency resource block(s), a time-frequency resource occupied by the first radio signal comprises S time-frequency resource block(s), and the S time-frequency resource block(s) belongs(belong) to the first time-frequency resource pool, S being a positive integer.

In one embodiment, a root sequence of the first sequence is used to determine the first time-frequency resource pool.

In one embodiment, a cyclic shift of the first sequence based on the root sequence is used to determine the first time-frequency resource pool.

In one embodiment, a time-frequency resource occupied by the first sequence is used to determine the first time-frequency resource pool.

In one embodiment, a time-frequency resource occupied by the first characteristic radio signal is used to determine the first time-frequency resource pool.

In one embodiment, the first sequence is used to determine a time-domain resource occupied by the first radio signal.

In one embodiment, the first sequence is used to determine a frequency-domain resource occupied by the first radio signal.

In one embodiment, the first sequence is used to determine a time-domain resource occupied by the first radio signal and a frequency-domain resource occupied by the first radio signal.

In one embodiment, the first sequence is associated with a time-domain resource occupied by the first radio signal.

In one embodiment, a time-domain resource occupied by the first sequence is associated with a time-domain resource occupied by the first radio signal.

In one embodiment, a time-domain resource occupied by the first characteristic radio signal is used to determine a time-domain resource occupied by the first radio signal.

In one embodiment, a root sequence of the first sequence is used to determine the time-domain resource occupied by the first radio signal.

In one embodiment, a time-domain resource occupied by the first radio signal and a time-domain resource occupied by the first sequence are spaced by a time offset.

In one embodiment, a time-domain resource occupied by the first radio signal and a time-domain resource occupied by the first characteristic radio signal are spaced by a time offset.

In one embodiment, the time offset is pre-defined.

In one embodiment, the time offset is configured.

In one embodiment, the time offset comprises a positive integer number of subframe(s).

In one embodiment, the time offset comprises a positive integer number of slot(s).

In one embodiment, the time offset comprises a positive integer number of multicarrier symbol(s).

In one embodiment, the first sequence is associated with a frequency-domain resource occupied by the first radio signal.

In one embodiment, a root sequence of the first sequence is used to determine a frequency-domain resource occupied by the first radio signal.

In one embodiment, a cyclic shift of the first sequence based on the root sequence is used to determine a frequency-domain resource occupied by the first radio signal.

In one embodiment, a frequency-domain resource occupied by the first sequence is used to determine a frequency-domain resource occupied by the first radio signal.

In one embodiment, a frequency-domain resource occupied by the first sequence belongs to a frequency-domain resource occupied by the first radio signal.

In one embodiment, a frequency-domain resource occupied by the first sequence is the same as a frequency-domain resource occupied by the first radio signal.

In one embodiment, a lowest subcarrier in a frequency-domain resource occupied by the first sequence is the same as a lowest subcarrier in a frequency-domain resource occupied by the first radio signal.

In one embodiment, a frequency-domain resource occupied by the first sequence and a frequency-domain resource occupied by the first radio signal are spaced by a frequency offset.

In one embodiment, a lowest subcarrier in a frequency-domain resource occupied by the first sequence and a lowest subcarrier in a frequency-domain resource occupied by the first radio signal are spaced by a frequency offset.

In one embodiment, a starting resource block in a frequency-domain resource occupied by the first sequence and a starting resource block in a frequency-domain resource occupied by the first radio signal are spaced by a frequency offset.

In one embodiment, the frequency offset is pre-defined.

In one embodiment, the frequency offset is configured.

In one embodiment, the frequency offset comprises a positive integer number of Physical Resource block(s) (PRB(s)).

In one embodiment, the frequency offset comprises a positive integer number of Precoding Resource block Group(s) (PRG(s)).

In one embodiment, the frequency offset comprises a positive integer number of subcarrier(s).

In one embodiment, a frequency-domain resource occupied by the first characteristic radio signal is used to determine a frequency-domain resource occupied by the first radio signal.

In one embodiment, a frequency-domain resource occupied by the first characteristic radio signal belongs to a frequency-domain resource occupied by the first radio signal.

In one embodiment, a frequency-domain resource occupied by the first characteristic radio signal is the same as a frequency-domain resource occupied by the first radio signal.

In one embodiment, a lowest subcarrier in a frequency-domain resource occupied by the first characteristic radio signal is the same as a lowest subcarrier in a frequency-domain resource occupied by the first radio signal.

In one embodiment, a starting resource block in a frequency-domain resource occupied by the first characteristic radio signal is the same as a starting resource block in a frequency-domain resource occupied by the first radio signal.

In one embodiment, a frequency-domain resource occupied by the first characteristic radio signal and a frequency-domain resource occupied by the first radio signal are spaced by a frequency offset.

In one embodiment, a lowest subcarrier in a frequency-domain resource occupied by the first characteristic radio signal and a lowest subcarrier in a frequency-domain resource occupied by the first radio signal are spaced by a frequency offset.

In one embodiment, a starting resource block in a frequency-domain resource occupied by the first characteristic radio signal and a starting resource block in a frequency-domain resource occupied by the first radio signal are spaced by a frequency offset.

In one embodiment, the first sequence is used to determine a scrambling sequence of the first radio signal.

In one embodiment, the first sequence is used to determine a receiving timing of the first radio signal.

In one embodiment, a first characteristic identifier is used for identifying the first node.

In one embodiment, the first characteristic identifier is a non-negative hexadecimal integer.

In one embodiment, the first characteristic identifier comprises 4 hexadecimal bits.

In one embodiment, the first characteristic identifier is a value between hexadecimal 0000 and hexadecimal FFFF.

In one embodiment, the first characteristic identifier is a Radio Network Temporary Identifier (RNTI).

In one embodiment, the first characteristic identifier is a Random Access Radio Network Temporary Identifier (RA-RNTI).

In one embodiment, the first characteristic identifier is a Cell Radio Network Temporary Identifier (C-RNTI).

In one embodiment, the first characteristic identifier is a Temporary Cell Radio Network Temporary Identifier (TC-RNTI).

In one embodiment, the first characteristic identifier is a Serving Temporary Mobile Subscriber Identity (S-TMSI).

In one embodiment, the first characteristic identifier is an International Mobile Subscriber Identification Number (IMSI).

In one embodiment, the first characteristic identifier is a Globally Unique Temporary UE Identity (GUTI).

In one embodiment, the first sequence comprises the first characteristic identifier.

In one embodiment, the first radio signal comprises the first characteristic identifier.

In one embodiment, the first sequence and the first radio signal jointly comprise the first characteristic identifier.

In one embodiment, the first sequence comprises a first characteristic sub-identifier, while the first radio signal comprises a second characteristic sub-identifier, and the first characteristic sub-identifier and the second characteristic sub-identifier are jointly used to determine the first characteristic identifier.

In one embodiment, at least one of the first sequence or the first radio signal carries the first characteristic identifier.

In one embodiment, the first sequence carries the first characteristic identifier.

In one embodiment, the first characteristic radio signal carries the first characteristic identifier.

In one embodiment, the first radio signal carries the first characteristic identifier.

In one embodiment, the first sequence and the first radio signal jointly carry the first characteristic identifier.

In one embodiment, the first sequence carries a third characteristic sub-identifier, while the first radio signal carries a fourth characteristic sub-identifier, and the third characteristic sub-identifier and the fourth characteristic sub-identifier are jointly used to determine the first characteristic identifier.

In one embodiment, the first characteristic identifier is used to determine the first sequence.

In one embodiment, the first characteristic identifier is used to determine the first sequence out of X0 characteristic sequence(s), X0 being a positive integer.

In one embodiment, the first characteristic identifier is used to generate the first characteristic radio signal.

In one embodiment, the first characteristic identifier is used to generate a root sequence of the first sequence.

In one embodiment, the first characteristic identifier is used to determine a cyclic shift of the first sequence based on the root sequence.

In one embodiment, the first characteristic identifier is used to determine a time-domain resource occupied by the first sequence.

In one embodiment, the first characteristic identifier is used to determine a frequency-domain resource occupied by the first sequence.

In one embodiment, the first characteristic identifier is used to determine a time-frequency resource occupied by the first sequence.

In one embodiment, the second bit block comprises the first characteristic identifier.

In one embodiment, the first characteristic identifier is used to generate the second bit block.

In one embodiment, the first characteristic identifier is used to generate a scrambling sequence of the first radio signal.

In one embodiment, the first characteristic identifier is used to determine a time-domain resource occupied by the first radio signal.

In one embodiment, the first characteristic identifier is used to determine a frequency-domain resource occupied by the first radio signal.

In one embodiment, the first characteristic identifier is used to determine a time-frequency resource occupied by the first radio signal.

In one embodiment, the first characteristic identifier is used to determine a time-frequency resource occupied by the first radio signal out of a positive integer number of time-frequency resource(s).

In one embodiment, the first characteristic identifier is used to generate at least one of the first sequence or the first radio signal.

In one embodiment, the first characteristic identifier is used to generate the first sequence and the first radio signal.

In one embodiment, the first characteristic identifier is used to determine at least one of a time-frequency resource occupied by the first sequence or a time-frequency resource occupied by the first radio signal.

In one embodiment, the first characteristic identifier is used to determine a time-frequency resource occupied by the first sequence and a time-frequency resource occupied by the first radio signal.

In one embodiment, the first characteristic identifier is used to determine at least one of the first sequence, the first radio signal, a time-frequency resource occupied by the first sequence or a time-frequency resource occupied by the first radio signal.

In one embodiment, the second characteristic identifier is used for identifying the first signaling.

In one embodiment, the second characteristic identifier is used for identifying the second radio signal.

In one embodiment, the second characteristic identifier is used for identifying the first signaling and the second radio signal.

In one embodiment, the second characteristic identifier is a non-negative hexadecimal integer.

In one embodiment, the second characteristic identifier comprises 4 hexadecimal bits.

In one embodiment, the second characteristic identifier is a value between hexadecimal 0000 and hexadecimal FFFF.

In one embodiment, the second characteristic identifier is an RNTI.

In one embodiment, the second characteristic identifier is an RA-RNTI.

In one embodiment, the second characteristic identifier is a C-RNTI.

In one embodiment, the second characteristic identifier is a TC-RNTI.

In one embodiment, the second characteristic identifier is an S-TMSI.

In one embodiment, the second characteristic identifier is an IMSI.

In one embodiment, the second characteristic identifier is a GUTI.

In one embodiment, the second characteristic identifier is equal to the first characteristic identifier.

In one embodiment, the second characteristic identifier is the first characteristic identifier.

In one embodiment, the second characteristic identifier is not the first characteristic identifier.

In one embodiment, the first characteristic identifier and the second characteristic identifier are two different RNTIs, respectively.

In one embodiment, the first characteristic identifier is a TC-RNTI, and the second characteristic identifier is a RA-RNTI.

In one embodiment, the first characteristic identifier is a C-RNTI, and the second characteristic identifier is a RA-RNTI.

In one embodiment, the first characteristic identifier is an S-TMSI, and the second characteristic identifier is an RNTI.

In one embodiment, the first characteristic identifier is an S-TMSI, and the second characteristic identifier is a RA-RNTI.

In one embodiment, a time-domain resource occupied by the first sequence is used to determine the second characteristic identifier.

In one embodiment, a frequency-domain resource occupied by the first sequence is used to determine the second characteristic identifier.

In one embodiment, a time-frequency resource occupied by the first sequence is used to determine the second characteristic identifier.

In one embodiment, a time-domain resource occupied by the first sequence and a frequency-domain resource occupied by the first sequence are jointly used to determine the second characteristic identifier.

In one embodiment, the second characteristic identifier is equal to a sum of 1, a symbol index of a first multicarrier symbol of a time-domain resource occupied by a PRACH, a multiple of a slot index of the time-domain resource occupied by the PRACH, a multiple of a frequency index of a frequency-domain resource occupied by the PRACH and a multiple of an uplink carrier index.

In one embodiment, the second characteristic identifier=1+a symbol index of a first multicarrier symbol of a time-domain resource occupied by a PRACH+14×a slot index of the time-domain resource occupied by the PRACH+14×80×a frequency index of a frequency-domain resource occupied by the PRACH+14×80×8×an uplink carrier index.

In one embodiment, a time-domain resource occupied by the first radio signal is used to determine the second characteristic identifier.

In one embodiment, a frequency-domain resource occupied by the first radio signal is used to determine the second characteristic identifier.

In one embodiment, a time-frequency resource occupied by the first radio signal is used to determine the second characteristic identifier.

In one embodiment, a time-frequency resource occupied by the first sequence and a time-frequency resource occupied by the first radio signal are jointly used to determine the second characteristic identifier.

In one embodiment, the random access occasion is used to determine the second characteristic identifier.

In one embodiment, the random access occasion is used to determine the second characteristic identifier out of a positive integer number of second-type characteristic identifier(s), the second characteristic identifier being one of the positive integer number of second-type characteristic identifier(s).

In one embodiment, the X0 characteristic sequence(s) corresponds(correspond) to the second characteristic identifier.

In one embodiment, the X characteristic sequence(s) corresponds(correspond) to the second characteristic identifier.

In one embodiment, the first signaling is transmitted through a PDCCH.

In one embodiment, the first signaling is transmitted through broadcast.

In one embodiment, the first signaling is transmitted through groupcast.

In one embodiment, the first signaling is transmitted through unicast.

In one embodiment, the first signaling is cell-specific.

In one embodiment, the first signaling is UE-specific.

In one embodiment, the first signaling is semi-statically configured.

In one embodiment, the first signaling is dynamically configured.

In one embodiment, the first signaling comprises all or part of a higher layer signaling.

In one embodiment, the first signaling comprises one or more fields of a PHY layer signaling.

In one embodiment, the first signaling comprises one or more fields of a piece of Downlink Control Information (DCI).

In one embodiment, the first signaling comprises one or more fields of a DCI format.

In one embodiment, the first signaling comprises one or more fields of a piece of SCI.

In one embodiment, the first signaling is a piece of DCI.

In one embodiment, the first signaling is a DCI format.

In one embodiment, the first signaling is a DCI format 1_0 in an NR system.

In one embodiment, the first signaling comprises a second characteristic identifier.

In one embodiment, the first signaling carries the second characteristic identifier.

In one embodiment, the second characteristic identifier is used to scramble the first signaling.

In one embodiment, the second characteristic identifier is used to generate a scrambling sequence of the first signaling.

In one embodiment, the second characteristic identifier is used to generate a Demodulation Reference Signal (DMRS) of the first signaling.

In one embodiment, the second characteristic identifier is used to generate CRC of the first signaling.

In one embodiment, the second radio signal is transmitted on a Downlink Shared Channel (DL-SCH).

In one embodiment, the second radio signal is transmitted on a PDSCH.

In one embodiment, the second radio signal is transmitted on a PSSCH.

In one embodiment, the second radio signal is transmitted on a PDCCH.

In one embodiment, the second radio signal is transmitted on a PSCCH.

In one embodiment, the first signaling and the second radio signal are respectively transmitted on a PDCCH and a PDSCH.

In one embodiment, the first signaling and the second radio signal are respectively transmitted on a PSCCH and a PSSCH.

In one embodiment, the second radio signal is cell-specific.

In one embodiment, the second radio signal is UE-specific.

In one embodiment, the second radio signal is transmitted by broadcast.

In one embodiment, the second radio signal is transmitted by groupcast.

In one embodiment, the second radio signal is transmitted by unicast.

In one embodiment, the second radio signal comprises all or part of a higher layer signaling.

In one embodiment, the second radio signal comprises all or part of an RRC layer signaling.

In one embodiment, the second radio signal comprises one or more fields of an RRC IE.

In one embodiment, the second radio signal comprises all or part of a MAC layer signaling.

In one embodiment, the second radio signal comprises one or more fields of a MAC CE.

In one embodiment, the second radio signal comprises one or more fields of a PHY layer.

In one embodiment, the second radio signal does not comprise DCI.

In one embodiment, the second radio signal does not comprise SCI.

In one embodiment, the second radio signal comprises a third bit block, the third bit block comprising a positive integer number of sequentially arranged bits.

In one embodiment, the third bit block comprises a positive integer number of CB(s).

In one embodiment, the third bit block comprises a positive integer number of CBG(s).

In one embodiment, the third bit block comprises a TB.

In one embodiment, the third bit block is obtained by a TB through TB-level CRC Attachment.

In one embodiment, the third bit block is a CB of Code Blocks obtained by a TB through TB-level CRC Attachment, Code Block Segmentation and CB-level CRC Attachment in sequence.

In one embodiment, the second radio signal is obtained by all or part of bits in the third bit block sequentially through TB-level CRC Attachment, Code Block Segmentation and CB-level CRC Attachment, Channel Coding, Rate Matching, Code Block Concatenation, Scrambling, Modulation, Layer Mapping and Antenna Port Mapping, Mapping to Physical Resource Blocks, and Baseband Signal Generation, Modulation and Upconversion.

In one embodiment, only the third bit block is used to generate the second radio signal.

In one embodiment, there is a Code Block other than the third bit block being used for generating the second radio signal.

In one embodiment, an SCS of subcarriers occupied by the second radio signal in frequency domain is one of 15 kHz, 30 kHz, 60 kHz, 120 kHz, 240 kHz, 480 kHz or 960 kHz.

In one embodiment, the second radio signal comprises the second characteristic identifier.

In one embodiment, the second characteristic identifier is used to generate a scrambling sequence of the second radio signal.

In one embodiment, the second characteristic identifier is used to generate CRC of the second radio signal.

In one embodiment, the second radio signal comprises all or part of information contained in a Random Access Response (RAR).

In one embodiment, the second radio signal is an RAR.

In one embodiment, the second radio signal comprises a Timing Advance Command (TAC).

In one embodiment, the second radio signal comprises a TC-RNTI.

In one embodiment, the second radio signal comprises a Backoff Indicator.

In one embodiment, the second radio signal comprises a UL grant, the UL Grant being used to schedule a radio signal.

In one embodiment, the second radio signal comprises one or more fields of the UL Grant.

In one embodiment, the second radio signal does not comprise the UL Grant.

In one embodiment, the second radio signal does not comprise at least one field of the UL Grant.

In one embodiment, the UL Grant is used to schedule a PUSCH.

In one embodiment, the UL Grant is used to schedule a PUSCH Msg3 in a random access step.

In one embodiment, the UL Grant comprises a RAR Uplink grant.

In one embodiment, the UL Grant comprises a Frequency Hopping Flag.

In one embodiment, the UL Grant comprises Frequency resource allocation of a radio signal.

In one embodiment, the UL Grant comprises Time resource allocation of a radio signal.

In one embodiment, the UL Grant comprises an MCS adopted by a radio signal.

In one embodiment, the UL Grant comprises a Transmitter Power Control command (TPC command) of a radio signal.

In one embodiment, the UL Grant comprises a Channel State Information (CSI) Request.

In one embodiment, the UL Grant comprises at least one of a Frequency Hopping Flag, Frequency resource allocation of a PUSCH, Time resource allocation of a PUSCH, an MCS, a TPC command or a CSI Request.

In one embodiment, the second radio signal comprises the first characteristic identifier.

In one embodiment, the second radio signal comprises the first characteristic identifier and does not comprise the UL Grant.

In one embodiment, the second radio signal comprises the first characteristic identifier and does not comprise at least one field of the UL Grant.

In one embodiment, the second radio signal comprises the first characteristic identifier and does not comprise at least one field of the RAR Uplink grant.

In one embodiment, the second radio signal comprises the first characteristic identifier and the second characteristic identifier.

In one embodiment, the first characteristic identifier and the second characteristic identifier are jointly used to generate the second radio signal.

In one embodiment, the second radio signal comprises the first characteristic identifier, and the second characteristic identifier is used to scramble the second radio signal.

In one embodiment, the first signaling is used to determine a frequency-domain resource occupied by the second radio signal.

In one embodiment, the first signaling is used to determine a time-domain resource occupied by the second radio signal.

In one embodiment, the first signaling is used to determine a time-domain resource occupied by the second radio signal and a frequency-domain resource occupied by the second radio signal.

In one embodiment, the first signaling comprises a time-frequency resource occupied by the second radio signal.

In one embodiment, the first signaling comprises a Modulation and Coding Scheme (MCS) adopted by the second radio signal.

In one embodiment, the first signaling comprises a time-frequency resource occupied by the second radio signal and an MCS adopted by the second radio signal.

In one embodiment, the first signaling comprises a Demodulation Reference Signal (DMRS) employed by the second radio signal.

In one embodiment, the first signaling comprises an Antenna Port (AP) corresponding to the DMRS employed by the second radio signal.

In one embodiment, the first signaling is used to determine a transmitting power employed by the second radio signal.

In one embodiment, the first signaling is used to determine a total number of bits comprised in the second bit block.

In one embodiment, the first signaling comprises scheduling information of the second radio signal.

In one embodiment, the first signaling indicates a time-frequency resource occupied by the second radio signal.

In one embodiment, the first signaling indicates an MCS adopted by the second radio signal.

In one embodiment, the first signaling indicates a Redundancy Version (RV) employed by the second radio signal.

In one embodiment, the first signaling indicates a time-frequency resource occupied by the second radio signal and an RV employed by the second radio signal.

In one embodiment, the first signaling indicates an MCS adopted by the second radio signal and an RV employed by the second radio signal.

In one embodiment, the first signaling indicates a time-frequency resource occupied by the second radio signal, an MCS adopted by the second radio signal and an RV employed by the second radio signal.

In one embodiment, the first signaling comprises a positive integer number of third-type fields, and two third-type fields of the positive integer number of third-type fields are respectively used to indicate a time-frequency resource occupied by the second radio signal and an MCS adopted by the second radio signal.

In one embodiment, the first signaling comprises a positive integer number of third-type fields, and three third-type fields of the positive integer number of third-type fields are respectively used to indicate a time-frequency resource occupied by the second radio signal, an MCS adopted by the second radio signal and an RV employed by the second radio signal.

In one embodiment, a CRC code of the first signaling is used to indicate scheduling information of the second radio signal.

In one embodiment, a DMRS of the first signaling is used to indicate scheduling information of the second radio signal.

In one embodiment, the first signaling is used to determine a time interval between a receiving time of the first signaling and a receiving time of the second radio signal.

In one embodiment, the time interval is pre-defined.

In one embodiment, the time interval is configured.

In one embodiment, the time interval comprises a positive integer number of subframe(s).

In one embodiment, the time interval comprises a positive integer number of slot(s).

In one embodiment, the time interval comprises a positive integer number of multicarrier symbol(s).

In one embodiment, the scheduling information comprises a time-frequency resource occupied by the second radio signal.

In one embodiment, the scheduling information comprises a Modulation and Coding Scheme (MCS) adopted by the second radio signal.

In one embodiment, the scheduling information comprises a Redundancy Version (RV) employed by the second radio signal.

In one embodiment, the scheduling information comprises a time-frequency resource occupied by the second radio signal and an MCS adopted by the second radio signal.

In one embodiment, the scheduling information comprises a time-frequency resource occupied by the second radio signal and an RV employed by the second radio signal.

In one embodiment, the scheduling information comprises an MCS adopted by the second radio signal and an RV employed by the second radio signal.

In one embodiment, the scheduling information comprises a time-frequency resource occupied by the second radio signal, an MCS adopted by the second radio signal and an RV employed by the second radio signal.

In one embodiment, the scheduling information comprises a time-frequency resource occupied by the second radio signal, an MCS adopted by the second radio signal, an RV employed by the second radio signal and an AP corresponding to the DMRS employed by the second radio signal.

In one embodiment, any of the X characteristic sequence(s) is transmitted on a RACH.

In one embodiment, any of the X characteristic sequence(s) is transmitted on a PRACH.

In one embodiment, any of the X characteristic sequence(s) is transmitted on a NPRACH.

In one embodiment, any of the X characteristic sequence(s) is cell-specific.

In one embodiment, any of the X characteristic sequence(s) is UE-specific.

In one embodiment, any of the X characteristic sequence(s) is transmitted by broadcast.

In one embodiment, any of the X characteristic sequence(s) is transmitted by groupcast.

In one embodiment, any of the X characteristic sequence(s) is transmitted by unicast.

In one embodiment, any of the X characteristic sequence(s) is a pseudo-random sequence.

In one embodiment, any of the X characteristic sequence(s) is a Gold sequence.

In one embodiment, any of the X characteristic sequence(s) is a M sequence.

In one embodiment, any of the X characteristic sequence(s) is a Zadeoff-Chu sequence.

In one embodiment, any of the X characteristic sequence(s) is a Preamble.

In one embodiment, for the way of generating the X characteristic sequence(s), refer to 3GPP TS38.211, section 6.3.3.1.

In one embodiment, X is a positive integer no greater than 64.

In one embodiment, the X characteristic sequence(s) belongs(belong) to the X0 characteristic sequence(s).

In one embodiment, the X characteristic sequence(s) is(are) transmitted on the random access occasion.

In one embodiment, an SCS of subcarriers occupied by any of the X characteristic sequence(s) in frequency domain is one of 1.25 kHz, 5 kHz, 15 kHz, 30 kHz, 60 kHz or 120 kHz.

In one embodiment, any of the X characteristic sequence(s) is a Long Preamble.

In one embodiment, any of the X characteristic sequence(s) is a Short Preamble.

In one embodiment, a third given characteristic sequence is one of the X characteristic sequence(s), the third given characteristic sequence is of a length of 839, and an SCS of subcarriers occupied by the third given characteristic sequence is either 1.25 kHz or 5 kHz.

In one embodiment, a fourth given characteristic sequence is one of the X characteristic sequence(s), the fourth given characteristic sequence is of a length of 139, and an SCS of subcarriers occupied by the fourth given characteristic sequence is one of 15 kHz, 30 kHz, 60 kHz or 120 kHz.

In one embodiment, the fourth given characteristic sequence comprises a positive integer number of fourth-type sub-sequence(s), each of the positive integer number of fourth-type sub-sequence(s) is a Zadeoff-Chu sequence, and each of the positive integer number of fourth-type sub-sequence(s) is of a length of 139, the positive integer number of fourth-type sub-sequence(s) being TDM.

In one embodiment, the positive integer number of fourth-type sub-sequences are identical.

In one embodiment, at least two of the positive integer number of fourth-type sub-sequences are different.

In one embodiment, any of the X characteristic sequence(s) is first through Discrete Fourier Transform (DFT) and then OFDM modulation processing.

In one embodiment, any of the X characteristic sequence(s) is first through Sequence Generation, DFT and Modulation, and then Resource Element Mapping, and finally Wideband Symbol Generation.

In one embodiment, the second radio signal comprises the first information block and the second information block.

In one embodiment, the second radio signal carries the first information block and the second information block.

In one embodiment, the first information block is generated by a higher layer of the second node in the present disclosure.

In one embodiment, the second information block is generated by a higher layer of the second node in the present disclosure.

In one embodiment, the first information block and the second information block are both generated by a higher layer of the second node in the present disclosure.

In one embodiment, at least one of the first information block or the second information block is generated by a higher layer of the second node in the present disclosure.

In one embodiment, at least one of the first information block or the second information block is generated by a MAC layer of the second node in the present disclosure.

In one embodiment, the first information block and the second information block are both generated by a MAC layer of the second node in the present disclosure.

In one embodiment, the first information block and the second information block are both generated by an RRC layer of the second node in the present disclosure.

In one embodiment, at least one of the first information block or the second information block is generated by a PHY layer of the second node in the present disclosure.

In one embodiment, the first information block and the second information block are both generated by a PHY layer of the second node in the present disclosure.

In one embodiment, the first information block and the second information block are transmitted from a higher layer of the second node to a PHY layer of the second node.

In one embodiment, the first information block and the second information block are transmitted from a MAC layer of the second node to a PHY layer of the second node.

In one embodiment, the first information block and the second information block are transmitted from an RRC layer of the second node to a MAC layer of the second node and then from the MAC layer of the second node to a PHY layer of the second node.

In one embodiment, the first information block and the second information block are used to generate the third bit block.

In one embodiment, the third bit block comprises the first information block and the second information block.

In one embodiment, the first information block and the second information block are parsed by a higher layer of the first node.

In one embodiment, the first information block and the second information block are parsed by a MAC layer of the first node.

In one embodiment, the first information block and the second information block are parsed by an RRC layer of the first node.

In one embodiment, the second radio signal also comprises an information block other than the first information block and the second information block.

In one embodiment, the second radio signal comprises a third information block, the third information block being different from the first information block and the second information block.

In one embodiment, the second radio signal comprises a positive integer number of first-type information block(s), and any of the positive integer number of first-type information block(s) comprises a first-type information sub-block of the X first-type information sub-block(s) and a second-type information sub-block of the X second-type information sub-block(s).

In one embodiment, the second radio signal comprises a positive integer number of second-type information block(s), and any of the positive integer number of second-type information block(s) comprises a first-type information sub-block of the X first-type information sub-block(s) and does not comprise any second-type information sub-block of the X second-type information sub-block(s).

In one embodiment, the second radio signal comprises one of the positive integer number of second-type information block(s).

In one embodiment, the second radio signal does not comprise any of the positive integer number of second-type information block(s).

In one embodiment, the second radio signal comprises a positive integer number of third-type information block(s), and any of the positive integer number of third-type information block(s) comprises a backoff indicator.

In one embodiment, the second radio signal comprises a third-type information block, the third-type information block comprising a backoff indicator.

In one embodiment, the second radio signal does not comprise the third-type information block.

In one embodiment, the second radio signal comprises the positive integer number of first-type information block(s) and the third-type information block.

In one embodiment, the second radio signal comprises the positive integer number of first-type information block(s) and the positive integer number of second-type information block(s).

In one embodiment, the second radio signal comprises the positive integer number of first-type information block(s), the positive integer number of second-type information block(s) and the third-type information block.

In one embodiment, the second radio signal comprises a Multimedia Access Control Protocol Data Unit (MAC PDU), and both the first information block and the second information block belong to the MAC PDU.

In one embodiment, the first information block belongs to the MAC PDU.

In one embodiment, the MAC PDU comprises a MAC header and a positive integer number of MAC Service Data Unit(s) (SDU(s)).

In one embodiment, the first information block comprises the MAC header, and the second information block comprises the positive integer number of MAC SDU(s).

In one embodiment, the MAC PDU comprises a positive integer number of MAC subPDU(s), and the positive integer number of MAC subPDU(s) comprises(comprise) a positive integer number of MAC subhead(s) and a positive integer number of MAC payload(s), respectively.

In one embodiment, the first information block comprises all or part of information in at least one of X MAC subPDU(s) out of the positive integer number of MAC subPDU(s).

In one embodiment, the first information block comprises all or part of information in any one of X MAC subPDU(s) out of the positive integer number of MAC subPDU(s).

In one embodiment, the second information block comprises all or part of information in at least one of X MAC subPDU(s) out of the positive integer number of MAC subPDU(s).

In one embodiment, the second information block comprises all or part of information in any one of X MAC subPDU(s) out of the positive integer number of MAC subPDU(s).

In one embodiment, the first information block comprises the positive integer number of MAC subhead(s), while the second information block comprises the positive integer number of MAC payload(s).

In one embodiment, the first information block comprises X MAC subhead(s) of the positive integer number of MAC subhead(s), while the second information block comprises X MAC payload(s) of the positive integer number of MAC payload(s).

In one embodiment, the first information block comprises all or part of a higher layer.

In one embodiment, the first information block comprises all or part of an RRC layer.

In one embodiment, the first information block comprises all or part of a MAC layer.

In one embodiment, the first information block comprises one or more fields of a MAC CE.

In one embodiment, the first information block comprises one or more fields of a PHY layer.

In one embodiment, the first information block is used to determine the X characteristic sequence(s).

In one embodiment, the first information block comprises X characteristic sequence identifier(s), and the X characteristic sequence identifier(s) corresponds(correspond) to the X characteristic sequence(s) respectively.

In one embodiment, any of the X characteristic sequence identifier(s) is a non-negative integer.

In one embodiment, any of the X characteristic sequence identifier(s) is an integer of 0 through (X0-1), X0 referring to the number of the X0 characteristic sequence(s).

In one embodiment, any of the X characteristic sequence identifier(s) is an integer of 0 through 63.

In one embodiment, any of the X characteristic sequence identifier(s) is a RAPID.

In one embodiment, the first information block comprises a bitmap, the bitmap comprising X0 first-type bit(s), the X0 first-type bit(s) corresponds(correspond) to the X0 characteristic sequence(s) respectively, and any one of the X0 first-type bit(s) is used to determine a corresponding characteristic sequence of the X0 characteristic sequence(s).

In one embodiment, a first bitmap bit is a first-type bit of the X0 first-type bit(s), and a first characteristic sequence is one of the X0 characteristic sequence(s) that corresponds to the first bitmap bit, the first bitmap bit being 1 means that the first characteristic sequence is comprised by the X characteristic sequence(s).

In one embodiment, the second information block comprises all or part of a higher layer.

In one embodiment, the second information block comprises all or part of an RRC layer.

In one embodiment, the second information block comprises all or part of a MAC layer.

In one embodiment, the second information block comprises one or more fields of a MAC CE.

In one embodiment, the second information block comprises one or more fields of a PHY layer.

In one embodiment, the second information block comprises X second-type information sub-block(s), and the X second-type information sub-block(s) corresponds(correspond) to the X characteristic sequence(s) respectively.

In one embodiment, the second information block comprises X second-type information sub-block(s), while the first information block comprises the X characteristic sequence identifier(s), the X second-type information sub-block(s) corresponding to the X characteristic sequence identifier(s) respectively.

In one embodiment, at least one of the X second-type information sub-block(s) comprises a MAC payload.

In one embodiment, at least one of the X second-type information sub-block(s) comprises an RAR.

In one embodiment, at least one of the X second-type information sub-block(s) comprises one or more fields of an RAR.

In one embodiment, at least one of the X second-type information sub-block(s) comprises a TAC.

In one embodiment, at least one of the X second-type information sub-block(s) comprises the first characteristic identifier.

In one embodiment, at least one of the X second-type information sub-block(s) comprises a TC-RNTI.

In one embodiment, at least one of the X second-type information sub-block(s) comprises a UL Grant, the UL Grant being used for scheduling a radio signal.

In one embodiment, at least one of the X second-type information sub-block(s) comprises an RAR Uplink grant.

In one embodiment, at least one of the X second-type information sub-block(s) comprises one or more fields of the UL Grant.

In one embodiment, at least one of the X second-type information sub-block(s) does not comprise the UL Grant.

In one embodiment, at least one of the X second-type information sub-block(s) does not comprise one or more fields of the UL Grant.

In one embodiment, at least one of the X second-type information sub-block(s) comprises a UE Contention Resolution Identity.

In one embodiment, at least one of the X second-type information sub-block(s) does not comprise a UE Contention Resolution Identity.

In one embodiment, the UE Contention Resolution Identity is one or more fields of a MAC CE.

In one embodiment, a third information sub-block and a fourth information sub-block are two second-type information sub-blocks of the X second-type information sub-blocks, of which the third information sub-block comprises the UL Grant, while the fourth information sub-block comprises the UE Contention Resolution Identity.

In one subembodiment, the third information sub-block comprises the UL Grant but does not comprise the UE Contention Resolution Identity.

In one subembodiment, the fourth information sub-block comprises the UE Contention Resolution Identity but does not comprise the UL Grant.

In one embodiment, at least one of the X second-type information sub-block(s) comprises the first characteristic identifier, and does not comprise the UL Grant.

In one embodiment, at least one of the X second-type information sub-block(s) comprises the first characteristic identifier, and does not comprise at least one field of the UL Grant.

In one embodiment, at least one of the X second-type information sub-block(s) comprises the first characteristic identifier, and does not comprise at least one field of the RAR uplink Grant.

In one embodiment, at least one of the X second-type information sub-block(s) comprises the first characteristic identifier.

In one embodiment, the X second-type information sub-block(s) comprises(respectively comprise) X MAC payload(s).

In one embodiment, the X second-type information sub-block(s) is(are respectively) X MAC payload(s).

In one embodiment, any of the X second-type information sub-block(s) comprises an RAR.

In one embodiment, any of the X second-type information sub-block(s) comprises one or more fields of an RAR.

In one embodiment, any of the X second-type information sub-block(s) comprises a TA.

In one embodiment, any of the X second-type information sub-block(s) comprises a UL Grant, the UL Grant being used for scheduling a radio signal.

In one embodiment, any of the X second-type information sub-block(s) comprises an RAR Uplink grant.

In one embodiment, any of the X second-type information sub-block(s) comprises one or more fields of the UL Grant.

In one embodiment, any of the X second-type information sub-block(s) does not comprise the UL Grant.

In one embodiment, any of the X second-type information sub-block(s) does not comprise one or more fields of the UL Grant.

In one embodiment, any of the X second-type information sub-block(s) comprises one or more fields of the RAR Uplink grant.

In one embodiment, any of the X second-type information sub-block(s) does not comprise the RAR Uplink grant.

In one embodiment, any of the X second-type information sub-block(s) does not comprise one or more fields of the RAR Uplink grant.

In one embodiment, any of the X second-type information sub-block(s) comprises a UE Contention Resolution Identity.

In one embodiment, any of the X second-type information sub-block(s) does not comprise a UE Contention Resolution Identity.

In one embodiment, any of the X second-type information sub-block(s) comprises the first characteristic identifier.

In one embodiment, any of the X second-type information sub-block(s) comprises the first characteristic identifier and does not comprise the UL Grant.

In one embodiment, any of the X second-type information sub-block(s) comprises the first characteristic identifier and does not comprise at least one field of the UL Grant.

In one embodiment, any of the X second-type information sub-block(s) comprises the first characteristic identifier and does not comprise at least one field of the RAR Uplink grant.

In one embodiment, the X second-type information sub-block(s) comprises(comprise) X first-type characteristic identifier(s) respectively, and the first characteristic identifier is one of the X first-type characteristic identifier(s).

In one embodiment, any of the X first-type characteristic identifier(s) is an RNTI.

In one embodiment, any of the X first-type characteristic identifier(s) is a C-RNTI.

In one embodiment, any of the X first-type characteristic identifier(s) is a TC-RNTI.

In one embodiment, any of the X first-type characteristic identifier(s) is an S-TMSI.

In one embodiment, the phrase that the first sequence is one of the X characteristic sequence(s) means that the first information block comprises the first sequence identifier, and the first sequence identifier is one of the X characteristic sequence identifier(s).

In one embodiment, the phrase that the first sequence is one of the X characteristic sequence(s) means that the first information block comprises X characteristic sequence identifier(s), and the first sequence identifier is one of the X characteristic sequence identifier(s).

In one embodiment, the X0 characteristic sequence identifier(s) comprises(comprise) the X characteristic sequence identifier(s).

In one embodiment, the phrase that the first sequence is one of the X characteristic sequence(s) means that the first characteristic sequence corresponding to the first bitmap bit comprised in the bitmap comprised by the first information block is the first sequence.

In one embodiment, if the first information block comprises the first sequence identifier, the first sequence is one of the X characteristic sequence(s).

In one embodiment, if the first sequence identifier is a characteristic sequence identifier of the X characteristic sequence identifier(s), the first sequence is one of the X characteristic sequence(s).

In one embodiment, if a bit in the first bitmap comprised by the first information block corresponding to the first sequence identifier is 1, the first sequence is one of the X characteristic sequence(s).

In one embodiment, at least one of the first signaling or the first information block is used to determine an information format of a second-type information sub-block of the X second-type information sub-block(s) that corresponds to the first sequence.

In one embodiment, the first signaling is used to determine an information format of a second-type information sub-block of the X second-type information sub-block(s) that corresponds to the first sequence.

In one embodiment, the first information block is used to determine an information format of a second-type information sub-block of the X second-type information sub-block(s) that corresponds to the first sequence.

In one embodiment, the first signaling and the first information block are jointly used to determine an information format of a second-type information sub-block of the X second-type information sub-block(s) that corresponds to the first sequence.

In one embodiment, if the first sequence is one of the X characteristic sequence(s), the first signaling is used to determine an information format of a second-type information sub-block of the X second-type information sub-block(s) that corresponds to the first sequence.

In one embodiment, if the first sequence is one of the X characteristic sequence(s), the first information block is used to determine an information format of a second-type information sub-block of the X second-type information sub-block(s) that corresponds to the first sequence.

In one embodiment, any of the X second-type information sub-block(s) comprises a positive integer number of second-type field(s), and any second-type field of the positive integer number of second-type field(s) comprises a positive integer number of bit(s).

In one embodiment, the information format of the second-type information sub-block is used to determine the positive integer number of second-type field(s) comprised by the second-type information sub-block.

In one embodiment, the information format of the second-type information sub-block is used to determine a total number of the second-type field(s) comprised by the second-type information sub-block.

In one embodiment, the information format of the second-type information sub-block is used to determine the positive integer number of second-type field(s) comprised by the second-type information sub-block and a number of bits comprised in each one of the second-type field(s).

In one embodiment, the information format of the second-type information sub-block is used to indicate that the positive integer number of second-type field(s) corresponds (correspond) to a positive integer number of piece(s) of information respectively.

In one embodiment, the information format of the second-type information sub-block is used to indicate a correspondence relationship between the positive integer number of second-type field(s) and a positive integer number of piece(s) of information.

In one embodiment, the information format of the second-type information sub-block is used to determine whether the second-type information sub-block comprises an RAR.

In one embodiment, the information format of the second-type information sub-block is used to determine whether the second-type information sub-block comprises a UL Grant.

In one embodiment, the information format of the second-type information sub-block is used to determine whether the second-type information sub-block comprises a UE Contention Resolution Identity.

In one embodiment, the information format of the second-type information sub-block is used to determine whether the second-type information sub-block comprises the first characteristic identifier.

Embodiment 2

Figure 2:
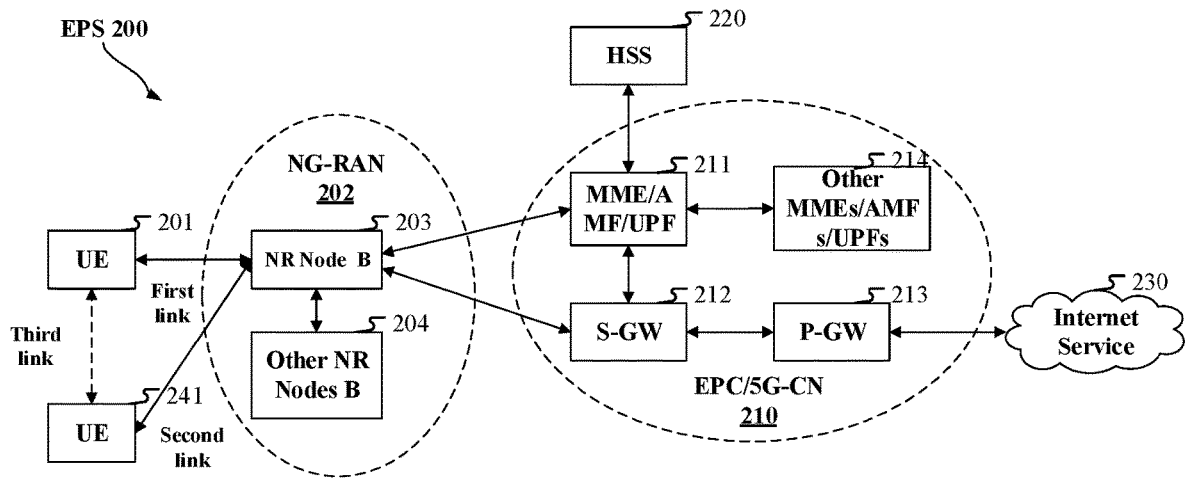
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or other appropriate terms, which may comprise one or more UEs 201, an NG-RAN 202, an Evolved Packet Core/5G Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the first node in the present disclosure comprises the UE 201.

In one embodiment, the second node in the present disclosure comprises the gNB 203.

In one embodiment, the UE in the present disclosure comprises the UE 201.

In one embodiment, the base station in the present disclosure comprises the gNB 203.

In one embodiment, a transmitter of the first sequence in the present disclosure comprises the UE 201.

In one embodiment, a receiver of the first sequence in the present disclosure comprises the gNB 203.

In one embodiment, a transmitter of the first radio signal in the present disclosure comprises the UE 201.

In one embodiment, a receiver of the first radio signal in the present disclosure comprises the gNB 203.

In one embodiment, a receiver of the first signaling in the present disclosure comprises the UE 201.

In one embodiment, a transmitter of the first signaling in the present disclosure comprises the gNB 203.

In one embodiment, a receiver of the second radio signal in the present disclosure comprises the UE 201.

In one embodiment, a transmitter of the second radio signal in the present disclosure comprises the gNB 203.

In one embodiment, a receiver of the third information block in the present disclosure comprises the UE 201.

In one embodiment, a transmitter of the third information block in the present disclosure comprises the gNB 203.

Embodiment 3

Figure 3:
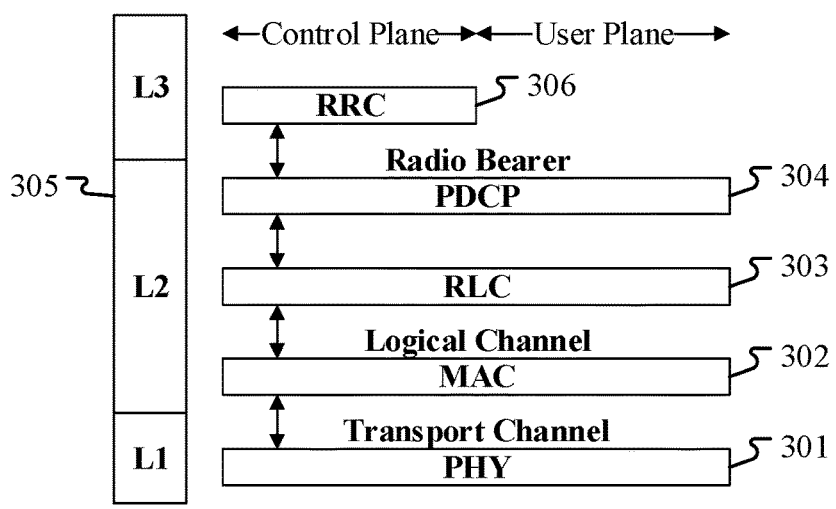
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram of an example of the radio protocol architecture used for a user plane and a control plane. In FIG. 3, the radio protocol architecture for a UE and a base station (gNB, or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first sequence in the present disclosure is generated by the PHY 301.

In one embodiment, the first radio signal in the present disclosure is generated by the RRC sublayer 306.

In one embodiment, the first radio signal in the present disclosure is generated by the MAC sublayer 302.

In one embodiment, the first radio signal in the present disclosure is generated by the PHY 301.

In one embodiment, the first signaling in the present disclosure is generated by the PHY 301.

In one embodiment, the second radio signal in the present disclosure is generated by the RRC sublayer 306.

In one embodiment, the second radio signal in the present disclosure is generated by the MAC sublayer 302.

In one embodiment, the second radio signal in the present disclosure is generated by the PHY 301.

In one embodiment, the first information block in the present disclosure is generated by the MAC sublayer 302.

In one embodiment, the second information block in the present disclosure is generated by the MAC sublayer 302.

In one embodiment, the third information block in the present disclosure is generated by the RRC sublayer 306.

Embodiment 4

Figure 4:
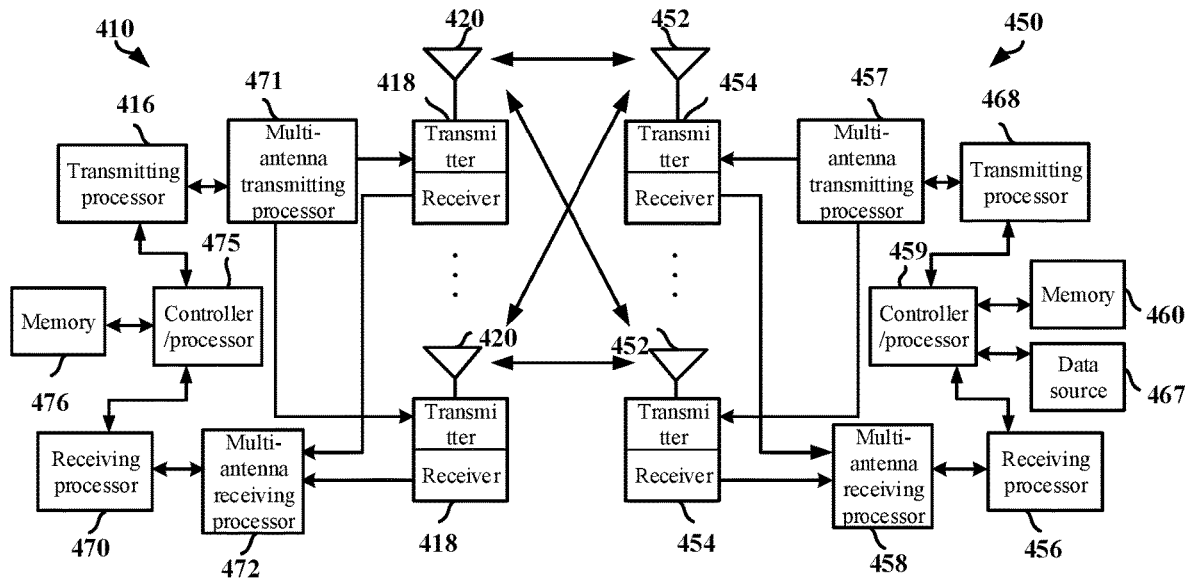
FIG. 4 illustrates a schematic diagram of a first node and a second node according to one embodiment of the present disclosure.

Embodiment 4 illustrates a schematic diagram of a first communication device(node) and a second communication device(node) according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure includes the second communication device 450, and the second node in the present disclosure includes the first communication device 410.

In one subembodiment, the first node is a UE, and the second node is a base station.

In one subembodiment, the first node is a UE, and the second node is a relay node.

In one subembodiment, the first node is a relay node, and the second node is a base station.

In one subembodiment, the second communication device 450 comprises at least one controller/receiver; the at least one controller/processor is in charge of HARQ operation.

In one subembodiment, the first communication device 410 comprises at least one controller/receiver; the at least one controller/processor is in charge of error detection using ACK and/or NACK protocols as a way to support HARQ operation.

In one subembodiment, the first communication device 410 comprises at least one controller/receiver; the at least one controller/processor is in charge of HARQ operation.

In one subembodiment, the second communication device 450 comprises at least one controller/receiver; the at least one controller/processor is in charge of error detection using ACK and/or NACK protocols as a way to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least transmits a first sequence and a first radio signal, the first sequence being used to determine a time-frequency resource occupied by the first radio signal; receives a first signaling; and receives a second radio signal, the first signaling being used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the second communication device 450 comprises a memory that stores computer readable instruction program, the computer readable instruction program generates actions when executed by at least one processor, which include: transmitting a first sequence and a first radio signal, the first sequence being used to determine a time-frequency resource occupied by the first radio signal; receiving a first signaling; and receiving a second radio signal, the first signaling being used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives a first sequence and a first radio signal, the first sequence being used to determine a time-frequency resource occupied by the first radio signal; transmits a first signaling; and transmits a second radio signal, the first signaling being used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the first communication device 410 comprises a memory that stores computer readable instruction program, the computer readable instruction program generates actions when executed by at least one processor, which include: receiving a first sequence and a first radio signal, the first sequence being used to determine a time-frequency resource occupied by the first radio signal; transmitting a first signaling; and transmitting a second radio signal, the first signaling being used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, at least one of the antenna 452, the transmitter 454, the multi-antenna transmitting processor 458, the transmitting processor 468, the controller/processor 459, the memory 460 or the data source 467 is used for transmitting the first sequence in the present disclosure.

In one embodiment, at least one of the antenna 452, the transmitter 454, the multi-antenna transmitting processor 458 or the transmitting processor 468 is used for transmitting the first sequence in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the first radio signal in the present disclosure.

In one embodiment, at least one of the antenna 452, the transmitter 454, the multi-antenna transmitting processor 458 or the transmitting processor 468 is used for transmitting the first radio signal in the present disclosure.

In one embodiment, at least one of the antenna 452, the receiver 454, the multi-antenna receiving processor 458, the receiving processor 456, the controller/processor 459, the memory 460 or the data source 467 is used for receiving the first signaling in the present disclosure.

In one embodiment, the antenna 452, the receiver 454, the multi-antenna receiving processor 458, the receiving processor 456, the controller/processor 459, the memory 460 and the data source 467 are used for receiving the first signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the second radio signal in the present disclosure.

In one embodiment, the antenna 452, the receiver 454, the multi-antenna receiving processor 458, the receiving processor 456, the controller/processor 459, the memory 460 and the data source 467 are used for receiving the second radio signal in the present disclosure.

In one embodiment, at least one of the antenna 452, the receiver 454, the multi-antenna receiving processor 458, the receiving processor 456, the controller/processor 459, the memory 460 or the data source 467 is used for receiving the third information block in the present disclosure.

In one embodiment, the antenna 452, the receiver 454, the multi-antenna receiving processor 458, the receiving processor 456, the controller/processor 459, the memory 460 and the data source 467 are used for receiving the third information block in the present disclosure.

Embodiment 5

Figure 5:
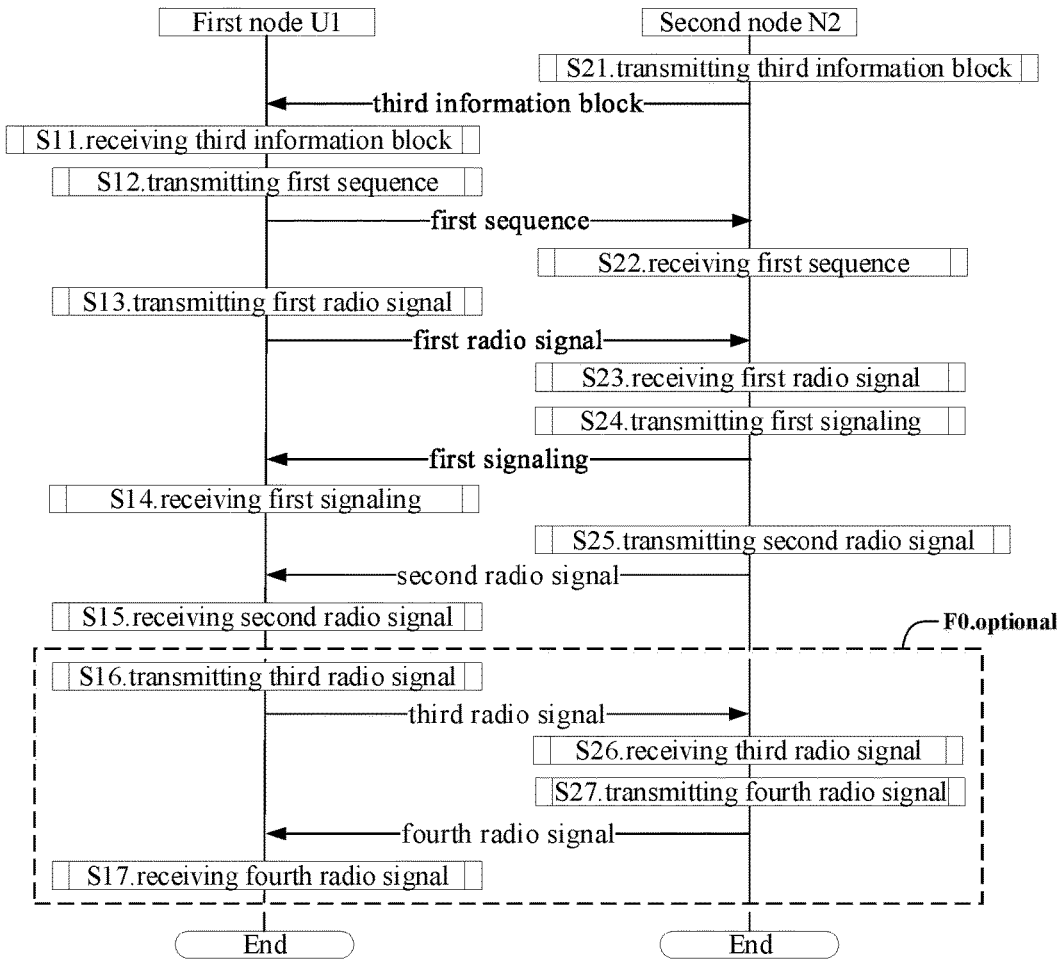
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and a second node N2 are communication nodes transmitting through an air interface. As illustrated by FIG. 5, the steps marked by the dotted-line framed box FO are optional.

The first node U1 receives a third information block in step S11; transmits a first sequence in step S12; and transmits a first radio signal in step S13; receives a first signaling in step S14; receives a second radio signal in step S15; transmits a third radio signal in step S16; and receives a fourth radio signal in step S17.

The second node N2 transmits a third information block in step S21; receives a first sequence in step S22; and receives a first radio signal in step S23; transmits a first signaling in step S24; transmits a second radio signal in step S25; receives a third radio signal in step S26; and transmits a fourth radio signal in step S27.

In Embodiment 5, the first sequence is used to determine a time-frequency resource occupied by the first radio signal; the first signaling is used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence; the third information block is used to determine a time length of a first time window; a time-domain resource occupied by the first signaling belongs to the first time window, at least one of a radio resource occupied by the first sequence or a radio resource occupied by the first radio signal is used to determine a start of the first time window; the first information block comprises X first-type information sub-block(s), and the X first-type information sub-block(s) is(are respectively) used to determine the X characteristic sequence(s); a first information sub-block is one of the X first-type information sub-block(s); the first information sub-block is used to determine the first sequence; the first information sub-block comprises a first field, the first field being used to determine an information format of a second-type information sub-block of the X second-type information sub-block(s) that corresponds to the first sequence; for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the at least one characteristic sequence; a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block.

In one embodiment, the second node N2 is a maintenance base station for a serving cell of the first node U1.

In one embodiment, the second node N2 is an access base station for a serving cell of the first node U1.

In one embodiment, the first signaling comprises a second field, the second field being used to indicate an information format of a second-type information sub-block of the X second-type information sub-block(s) that corresponds to the first sequence.

In one embodiment, a first bit block is used to generate the first signaling, and the number of bits comprised in the first bit block is used to determine an information format of a second-type information sub-block of the X second-type information sub-block(s) that corresponds to the first sequence.

In one embodiment, the steps marked by the box FO in FIG. 5 do not exist.

In one embodiment, the steps marked by the box FO in FIG. 5 exist.

In one embodiment, the information format of a second-type information sub-block of the X second-type information sub-block(s) that corresponds to the first sequence determines whether the steps marked by the box FO in FIG. 5 exist.

In one embodiment, if the information format of a second-type information sub-block of the X second-type information sub-block(s) that corresponds to the first sequence determines that the second-type information sub-block comprises the UL Grant, the steps marked by the box FO in FIG. 5 exist.

In one embodiment, if the information format of a second-type information sub-block of the X second-type information sub-block(s) that corresponds to the first sequence determines that the second-type information sub-block does not comprise the UL Grant, the steps marked by the box FO in FIG. 5 don't exist.

In one embodiment, if the information format of a second-type information sub-block of the X second-type information sub-block(s) that corresponds to the first sequence determines that the second-type information sub-block comprises the RAR Uplink grant, the steps marked by the box FO in FIG. 5 exist.

In one embodiment, if the information format of a second-type information sub-block of the X second-type information sub-block(s) that corresponds to the first sequence determines that the second-type information sub-block does not comprise the RAR Uplink grant, the steps marked by the box FO in FIG. 5 don't exist.

In one embodiment, if the information format of a second-type information sub-block of the X second-type information sub-block(s) that corresponds to the first sequence determines that the second-type information sub-block comprises the UE Contention Resolution Identity, the steps marked by the box FO in FIG. 5 don't exist.

In one embodiment, if the information format of a second-type information sub-block of the X second-type information sub-block(s) that corresponds to the first sequence determines that the second-type information sub-block does not comprise the UE Contention Resolution Identity, the steps marked by the box FO in FIG. 5 exist.

In one embodiment, a radio resource occupied by the first sequence comprises a time-domain resource occupied by the first sequence.

In one embodiment, a radio resource occupied by the first sequence comprises a frequency-domain resource occupied by the first sequence.

In one embodiment, a radio resource occupied by the first sequence comprises a code-domain resource occupied by the first sequence.

In one embodiment, a radio resource occupied by the first sequence comprises a time-domain resource and a frequency-domain resource occupied by the first sequence.

In one embodiment, a radio resource occupied by the first sequence comprises a time-domain resource occupied by the first sequence, a frequency-domain resource occupied by the first sequence and a code-domain resource occupied by the first sequence.

In one embodiment, a radio resource occupied by the first sequence is a radio resource occupied by the first characteristic radio signal.

In one embodiment, a radio resource occupied by the first radio signal comprises a time-domain resource occupied by the first radio signal.

In one embodiment, a radio resource occupied by the first radio signal comprises a frequency-domain resource occupied by the first radio signal.

In one embodiment, a radio resource occupied by the first radio signal comprises a code-domain resource occupied by the first radio signal.

In one embodiment, a radio resource occupied by the first radio signal comprises a time-domain resource and a frequency-domain resource occupied by the first radio signal.

In one embodiment, a radio resource occupied by the first radio signal comprises a time-domain resource occupied by the first radio signal, a frequency-domain resource occupied by the first radio signal and a code-domain resource occupied by the first radio signal.

In one embodiment, if a second-type information sub-block of the X second-type information sub-block(s) corresponding to the first sequence comprises the UE Contention Resolution Identity, the third radio signal is not transmitted.

In one embodiment, if a second-type information sub-block of the X second-type information sub-block(s) corresponding to the first sequence comprises the UL Grant, the third radio signal is transmitted.

In one embodiment, the third radio signal is a PUSCH Msg3.

In one embodiment, the third radio signal is transmitted on a PUSCH.

In one embodiment, if a second-type information sub-block of the X second-type information sub-block(s) corresponding to the first sequence comprises the UE Contention Resolution Identity, the fourth radio signal is not received.

In one embodiment, if a second-type information sub-block of the X second-type information sub-block(s) corresponding to the first sequence comprises the UL Grant, the fourth radio signal is received.

In one embodiment, the fourth radio signal comprises the UE Contention Resolution Identity.

In one embodiment, the fourth radio signal is transmitted on a PDSCH.

In one embodiment, the fourth radio signal is transmitted on a PDCCH and a PDSCH.

Embodiment 6

Figure 6:
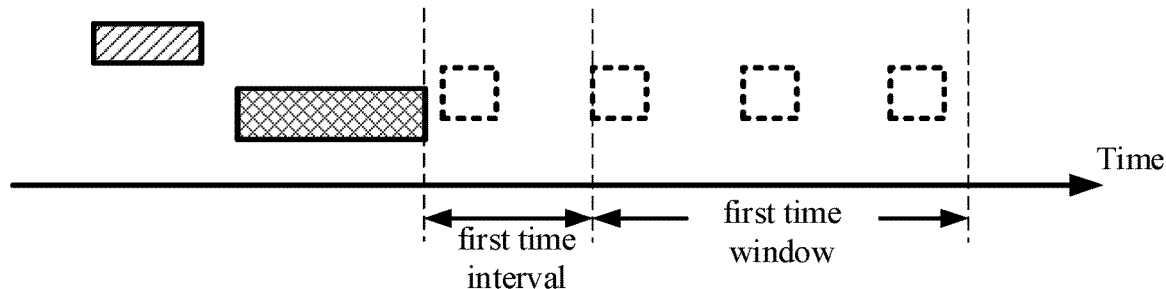
FIG. 6 illustrates a schematic diagram of relations between a first sequence, a first radio signal, a first signaling and a first time window according to one embodiment of the present disclosure.

Embodiment 6 illustrates a schematic diagram of relations between a first sequence, a first radio signal, a first signaling and a first time window according to one embodiment of the present disclosure, as shown in FIG. 6. In FIG. 6, the horizontal axis represents time, a rectangle filled with slashes represents the first sequence, and a rectangle filled with oblique grids represents the first radio signal, each blank square formed by dotted lines represents an instant of time for monitoring the first signaling, and a time interval between an end time of a time-domain resource occupied by the first radio signal and a start of the first time window.

In Embodiment 6, a time-domain resource occupied by the first signaling in the present disclosure belongs to the first time window, and the third information block in the present disclosure is used to determine a length of the first time window.

In one embodiment, the third information block is transmitted through the first-type channel in the present disclosure.

In one embodiment, the third information block is transmitted through a PDCCH.

In one embodiment, the third information block is transmitted through a PDSCH.

In one embodiment, the third information block is transmitted through a PDCCH and a PDSCH.

In one embodiment, the third information block is transmitted through broadcast.

In one embodiment, the third information block is transmitted through groupcast.

In one embodiment, the third information block is transmitted through unicast.

In one embodiment, the third information block is cell-specific.

In one embodiment, the third information block is UE-specific.

In one embodiment, the third information block comprises all or part of a higher layer signaling.

In one embodiment, the third information block comprises all or part of an RRC layer signaling.

In one embodiment, the third information block comprises one or more fields of an RRC IE.

In one embodiment, the third information block comprises one or more fields of a Master Information Block (MIB).

In one embodiment, the third information block comprises one or more fields of a System Information Block (SIB).

In one embodiment, the third information block comprises all or part of a MAC layer signaling.

In one embodiment, the third information block comprises one or more fields of a PHY layer signaling.

In one embodiment, the third information block comprises all or part of a ra-ResponseWindow field in a RACH-ConfigGeneric IE in the NR system.

In one embodiment, the first time window comprises a positive integer number of slot(s).

In one embodiment, the first time window comprises a positive integer number of multicarrier symbol(s).

In one embodiment, the first time window comprises a positive integer number of subframe(s).

In one embodiment, the first time window comprises a positive integer number of radio frame(s).

In one embodiment, the first time window comprises a positive integer number of millisecond(s) (ms).

In one embodiment, parameters of a first time window comprise one or more of a start of the first time window, an end time of the first time window or a time length (that is, Response Window Size) of the first time window.

In one embodiment, the time length of the first time window is an integral multiple of slots.

In one embodiment, the time length of the first time window is an integral multiple of multicarrier symbols.

In one embodiment, the time length of the first time window is an integral multiple of subframes.

In one embodiment, the time length of the first time window is no greater than 10 ms.

In one embodiment, the time length of the first time window is 1 slot.

In one embodiment, the time length of the first time window is 2 slots.

In one embodiment, the time length of the first time window is 4 slots.

In one embodiment, the time length of the first time window is 8 slots.

In one embodiment, the time length of the first time window is 10 slots.

In one embodiment, the time length of the first time window is 20 slots.

In one embodiment, the time length of the first time window is 40 slots.

In one embodiment, the time length of the first time window is 80 slots.

In one embodiment, a time-domain resource occupied by the first signaling belongs to the first time window.

In one embodiment, the first time window comprises a time-domain resource occupied by the first signaling.

In one embodiment, the first signaling is transmitted in the first time window.

In one embodiment, the first node monitors the first signaling in the first time window.

In one embodiment, a start of the first time window is the time at which the first node starts to monitor the first signaling.

In one embodiment, an end of the first time window is the latest time at which the first node stops monitoring the first signaling.

In one embodiment, a time length of the first time window is a duration lasting from a start time of the first time window till an end time of the first time window.

In one embodiment, the time length of the first time window is configured by the third information block.

In one embodiment, the third information block indicates the time length of the first time window.

In one embodiment, the third information block indicates that the time length of the first time window is one of 1 slot, 2 slots, 4 slots, 8 slots, 10 slots, 20 slots, 40 slots or 80 slots.

In one embodiment, the monitoring refers to blind detection-based reception, namely, the first node receives a signal within the first time window and performs decoding operation, if the decoding is determined to be correct according to a CRC bit, it is then determined that the first signaling is successfully received in the first time window; otherwise, it is determined that the first signaling is not received successfully in the first time window.

In one embodiment, the monitoring refers to coherent detection-based reception, namely, the first node performs coherent reception on a radio signal in the first time window using an RS sequence corresponding to DMRS of the first signaling, and then measures energy of an obtained signal by the coherent reception; if the energy of the obtained signal by the coherent reception is larger than a first given threshold, it is determined that the first signaling is successfully received in the first time window; otherwise, it is determined that the first signaling is not received successfully in the first time window.

In one embodiment, the monitoring refers to energy detection-based reception, namely, the first node senses energy of a radio signal in the first time window and averages in time to acquire a received energy; if the received energy is larger than a second given threshold, it is determined that first signaling is successfully received in the first time window; otherwise, it is determined that the first signaling is not received successfully in the first time window.

In one embodiment, the first signaling being detected means that after the first signaling is received based on blind detection, the decoding is determined to be correct according to a CRC bit.

In one embodiment, a radio resource occupied by the first radio signal is used to determine a start of the first time window.

In one embodiment, a radio resource occupied by the first radio signal comprises at least one of a time-domain resource occupied by the first radio signal, a frequency-domain resource occupied by the first radio signal or a code-domain resource occupied by the first radio signal.

In one embodiment, a radio resource occupied by the first radio signal comprises a time-domain resource occupied by the first radio signal.

In one embodiment, a radio resource occupied by the first radio signal comprises a frequency-domain resource occupied by the first radio signal.

In one embodiment, a radio resource occupied by the first radio signal comprises a code-domain resource occupied by the first radio signal.

In one embodiment, a radio resource occupied by the first radio signal comprises a time-domain resource occupied by the first radio signal and a frequency-domain resource occupied by the first radio signal.

In one embodiment, a radio resource occupied by the first sequence is used to determine a start of the first time window.

In one embodiment, a time interval between an end time of a time-domain resource occupied by the first sequence and a start of the first time window is a first time interval, and a time length of the first time interval is no smaller than a first threshold, the first threshold being pre-defined.

In one embodiment, a time interval between an end time of a time-domain resource occupied by the first sequence and a start of the first time window is a first time interval, and a time length of the first time interval is no smaller than a first threshold, the first threshold being configurable.

In one embodiment, a time interval between an end time of a time-domain resource occupied by the first sequence and a start of the first time window is a first time interval, and a time length of the first time interval is no smaller than 1 ms.

In one embodiment, a time interval between an end time of a time-domain resource occupied by the first sequence and a start of the first time window is a first time interval, and a time length of the first time interval is no smaller than a first threshold, the first threshold being related to a subcarrier spacing (SCS) of subcarriers occupied by the first signaling in the present disclosure.

In one embodiment, a time interval between an end time of a time-domain resource occupied by the first sequence and a start of the first time window is a first time interval, and a time length of the first time interval is no smaller than a first threshold, the first threshold being equal to a time length of one of multicarrier symbols occupied by the first signaling in the present disclosure.

In one embodiment, the phrase that "an end time of a time-domain resource occupied by the first sequence is used to determine a start of the first time window" includes a meaning that the end time of the time-domain resource occupied by the first sequence is the start of the first time window.

In one embodiment, the phrase that "an end time of a time-domain resource occupied by the first sequence is used to determine a start of the first time window" includes a meaning that the end time of the time-domain resource occupied by the first sequence is no later than the start of the first time window.

In one embodiment, the phrase that "an end time of a time-domain resource occupied by the first sequence is used to determine a start of the first time window" includes a meaning that the start of the first time window is a first time, and the end time of the time-domain resource occupied by the first sequence is a second time, the first time is later than the second time, and a time interval between the first time and the second time is no shorter than a time length of a multicarrier symbol (i.e., OFDM symbol), and an SCS corresponding to the multicarrier symbol is equivalent to the SCS employed by the first signaling.

In one embodiment, the phrase that "an end time of a time-domain resource occupied by the first sequence is used to determine a start of the first time window" includes a meaning that the start of the first time window is a first time, and the end time of the time-domain resource occupied by the first sequence is a second time, the first time is later than the second time, and a time interval between the first time and the second time is equal to a time length of a multicarrier symbol (i.e., OFDM symbol), and an SCS corresponding to the multicarrier symbol is equivalent to the SCS employed by the first signaling.

In one embodiment, the phrase that "an end time of a time-domain resource occupied by the first sequence is used to determine a start of the first time window" includes a meaning that the start of the first time window is a first time, and the end time of the time-domain resource occupied by the first sequence is a second time, the first time is later than the second time, and a time interval between the first time and the second time is no shorter than a time length of a multicarrier symbol (i.e., OFDM symbol), the first time is a start time of an earliest Control Resource Set (CORESET) that comprises a Physical Downlink Control Channel (PDCCH) common search space, and an SCS corresponding to the multicarrier symbol is equivalent to an SCS of the earliest CORESET.

In one embodiment, the phrase that "an end time of a time-domain resource occupied by the first sequence is used to determine a start of the first time window" includes a meaning that the start of the first time window is a first time, and the end time of the time-domain resource occupied by the first sequence is a second time, the first time is later than the second time, and a time interval between the first time and the second time is no shorter than a time length of a multicarrier symbol (i.e., OFDM symbol), the first time is a start time of an earliest CORESET that comprises a Type1 PDCCH Common Search Space, and an SCS corresponding to the multicarrier symbol is equivalent to an SCS of the earliest CORESET.

In one embodiment, the phrase that "an end time of a time-domain resource occupied by the first sequence is used to determine a start of the first time window" includes a meaning that the end time of a time-domain resource occupied by the first sequence is used by the first node for determining the start of the first time window.

In one embodiment, the phrase that "an end time of a time-domain resource occupied by the first sequence is used to determine a start of the first time window" includes a meaning that the end time of a time-domain resource occupied by the first sequence is used for directly determining the start of the first time window.

In one embodiment, the phrase that "an end time of a time-domain resource occupied by the first sequence is used to determine a start of the first time window" includes a meaning that the end time of a time-domain resource occupied by the first sequence is used for indirectly determining the start of the first time window.

In one embodiment, the phrase that "an end time of a time-domain resource occupied by the first sequence is used to determine a start of the first time window" includes a meaning that the end time of a time-domain resource occupied by the first sequence is used for explicitly determining the start of the first time window.

In one embodiment, the phrase that "an end time of a time-domain resource occupied by the first sequence is used to determine a start of the first time window" includes a meaning that the end time of a time-domain resource occupied by the first sequence is used for implicitly determining the start of the first time window.

In one embodiment, a time-domain resource occupied by the first radio signal is used to determine a start of the first time window.

In one embodiment, a time interval between an end time of a time-domain resource occupied by the first radio signal and a start of the first time window is a first time interval, and a time length of the first time interval is no less than a first threshold, the first threshold being pre-defined.

In one embodiment, a time interval between an end time of a time-domain resource occupied by the first radio signal and a start of the first time window is a first time interval, and a time length of the first time interval is no less than a first threshold, the first threshold being configurable.

In one embodiment, a time interval between an end time of a time-domain resource occupied by the first radio signal and a start of the first time window is a first time interval, and a time length of the first time interval is no less than 1 ms.

In one embodiment, a time interval between an end time of a time-domain resource occupied by the first radio signal and a start of the first time window is a first time interval, and a time length of the first time interval is no less than a first threshold, the first threshold being related to an SCS of subcarriers occupied by the first signaling.

In one embodiment, a time interval between an end time of a time-domain resource occupied by the first radio signal and a start of the first time window is a first time interval, and a time length of the first time interval is no less than a first threshold, the first threshold being equal to a time length of one of multicarrier symbols occupied by the first signaling in the present disclosure.

In one embodiment, the phrase that "an end time of a time-domain resource occupied by the first radio signal is used to determine a start of the first time window" includes a meaning that the end time of the time-domain resource occupied by the first radio signal is the start of the first time window.

In one embodiment, the phrase that "an end time of a time-domain resource occupied by the first radio signal is used to determine a start of the first time window" includes a meaning that the end time of the time-domain resource occupied by the first radio signal is no later than the start of the first time window.

In one embodiment, the phrase that "an end time of a time-domain resource occupied by the first radio signal is used to determine a start of the first time window" includes a meaning that the start of the first time window is a first time, and an end time of the time-domain resource occupied by the first radio signal is a second time, the first time is later than the second time, and a time interval between the first time and the second time is no shorter than a time length of a multicarrier symbol (i.e., OFDM symbol), and an SCS corresponding to the multicarrier symbol is equivalent to the SCS employed by the first signaling.

In one embodiment, the phrase that "an end time of a time-domain resource occupied by the first radio signal is used to determine a start of the first time window" includes a meaning that the start of the first time window is a first time, and an end time of the time-domain resource occupied by the first radio signal is a second time, the first time is later than the second time, and a time interval between the first time and the second time is equal to a time length of a multicarrier symbol (i.e., OFDM symbol), and an SCS corresponding to the multicarrier symbol is equivalent to the SCS employed by the first signaling.

In one embodiment, the phrase that "an end time of a time-domain resource occupied by the first radio signal is used to determine a start of the first time window" includes a meaning that the start of the first time window is a first time, and an end time of the time-domain resource occupied by the first radio signal is a second time, the first time is later than the second time, and a time interval between the first time and the second time is no shorter than a time length of a multicarrier symbol (i.e., OFDM symbol), the first time is a start time of an earliest Control Resource Set (CORESET) that comprises a PDCCH common search space, and an SCS corresponding to the multicarrier symbol is equivalent to an SCS of the earliest CORESET.

In one embodiment, the phrase that "an end time of a time-domain resource occupied by the first radio signal is used to determine a start of the first time window" includes a meaning that the start of the first time window is a first time, and an end time of the time-domain resource occupied by the first radio signal is a second time, the first time is later than the second time, and a time interval between the first time and the second time is no shorter than a time length of a multicarrier symbol (i.e., OFDM symbol), the first time is a start time of an earliest CORESET that comprises a Type1 PDCCH Common Search Space, and an SCS corresponding to the multicarrier symbol is equivalent to an SCS of the earliest CORESET.

In one embodiment, the phrase that "an end time of a time-domain resource occupied by the first radio signal is used to determine a start of the first time window" includes a meaning that the end time of the time-domain resource occupied by the first radio signal is used by the first node for determining the start of the first time window.

In one embodiment, the phrase that "an end time of a time-domain resource occupied by the first radio signal is used to determine a start of the first time window" includes a meaning that the end time of the time-domain resource occupied by the first radio signal is used for directly determining the start of the first time window.

In one embodiment, the phrase that "an end time of a time-domain resource occupied by the first radio signal is used to determine a start of the first time window" includes a meaning that the end time of the time-domain resource occupied by the first radio signal is used for indirectly determining the start of the first time window.

In one embodiment, the phrase that "an end time of a time-domain resource occupied by the first radio signal is used to determine a start of the first time window" includes a meaning that the end time of the time-domain resource occupied by the first radio signal is used for explicitly determining the start of the first time window.

In one embodiment, the phrase that "an end time of a time-domain resource occupied by the first radio signal is used to determine a start of the first time window" includes a meaning that the end time of the time-domain resource occupied by the first radio signal is used for implicitly determining the start of the first time window.

In one embodiment, a radio resource occupied by the first sequence and a radio resource occupied by the first radio signal are jointly used to determine a start of the first time window.

Embodiment 7

Figure 7:
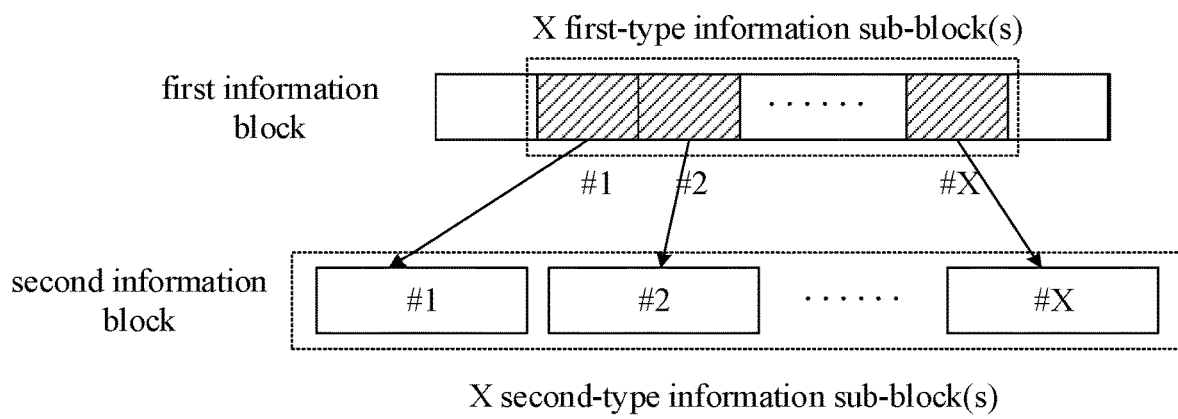
FIG. 7 illustrates a schematic diagram of a relationship between X first-type information sub-block(s) and X second-type information sub-block(s) according to one embodiment of the present disclosure.

Embodiment 7 illustrates a schematic diagram of a relationship between X first-type information sub-block(s) and X second-type information sub-block(s) according to one embodiment of the present disclosure, as shown in FIG. 7.

In FIG. 7, each rectangle filled with slashes represents one of X first-type information sub-block(s) in the present disclosure.

In Embodiment 7, the first information block comprises X first-type information sub-block(s), and the X first-type information sub-block(s) is(are respectively) used to determine the X characteristic sequence(s); the second information block comprises X second-type information sub-block(s), and the X first-type information sub-block(s) corresponds(correspond) to the X second-type information sub-block(s) respectively.

In one embodiment, the X first-type information sub-block(s) comprises(comprise) the X characteristic sequence identifier(s) respectively, while the X second-type information sub-block(s) corresponds(correspond) to the X characteristic sequence identifier(s) respectively.

In one embodiment, the X first-type information sub-block(s) comprises(comprise) the X characteristic sequence identifier(s) respectively, while the X second-type information sub-block(s) corresponds(correspond) to the X characteristic sequence(s) identified by the X characteristic sequence identifier(s) respectively.

In one embodiment, any of the X first-type information sub-block(s) comprises a MAC subheader.

In one embodiment, any of the X first-type information sub-block(s) comprises a characteristic sequence identifier of the X0 characteristic sequence identifier(s).

In one embodiment, any of the X first-type information sub-block(s) comprises a RAPID.

In one embodiment, a characteristic sequence identifier of the X0 characteristic sequence identifier(s) is a field comprised by any one of the X first-type information sub-block(s).

In one embodiment, the first information block comprises X1 first-type information sub-block(s), the X1 first-type information sub-block(s) comprises(comprise) the X first-type information sub-block(s), and the X first-type information sub-block(s) corresponds(correspond) to the X second-type information sub-block(s) respectively, X1 being no less than X.

In one embodiment, X1 is greater than X.

In one embodiment, there is a first-type information sub-block of the X1 first-type information sub-block(s) not belonging to the X first-type information sub-block(s).

In one embodiment, any one of the X1 first-type information sub-block(s) comprises a positive integer number of sequentially arranged bits.

In one embodiment, any one of the X1 first-type information sub-block(s) comprises a positive integer number of field(s).

In one embodiment, the X1 first-type information sub-blocks respectively comprise X1 third-type fields, and any of the X1 third-type fields indicates whether one of the X1 first-type information sub-blocks corresponding to one of the X1 third-type fields is a last first-type information sub-block of the X1 first-type information sub-blocks.

In one embodiment, each of the X1 third-type fields is an Extension Field.

In one embodiment, the X1 first-type information sub-block(s) comprises(comprise) X1 first-type field(s) respectively, and any of the X1 first-type field(s) indicates whether one of the X1 first-type information sub-block(s) corresponding to one of the X1 first-type field(s) comprises a Backoff Indicator (BI).

In one embodiment, the X1 first-type information sub-block(s) comprises(comprise) X1 first-type field(s) respectively, and any of the X1 first-type field(s) indicates whether one of the X1 first-type information sub-block(s) corresponding to one of the X1 first-type field(s) comprises a characteristic sequence identifier of the X0 characteristic sequence identifier(s).

In one embodiment, the X1 first-type information sub-block(s) comprises(comprise) X1 first-type field(s) respectively, and any of the X1 first-type field(s) indicates that one of the X1 first-type information sub-block(s) corresponding to one of the X1 first-type field(s) comprises either a characteristic sequence identifier of the X0 characteristic sequence identifier(s) or the Backoff Indicator (BI).

In one embodiment, each of the X1 first-type field(s) is a Type Field.

In one embodiment, the first information block comprises a BI.

In one embodiment, the first information block does not comprise a BI.

In one embodiment, a fifth information sub-block is one of the X1 first-type information sub-block(s), and the fifth information sub-block does not belong to the X first-type information sub-block(s).

In one embodiment, the fifth information sub-block comprises the BI.

In one embodiment, the fifth information sub-block comprises the first characteristic sequence identifier.

In one embodiment, a fifth field is one of the X1 first-type field(s), the fifth information sub-block comprises the fifth field, and the fifth field indicates whether the fifth information sub-block comprises the Backoff Indicator (BI).

In one embodiment, a fifth field is one of the X1 first-type field(s), the fifth information sub-block comprises the fifth field, and the fifth field indicates whether the fifth information sub-block comprises a characteristic sequence identifier of the X0 characteristic sequence identifier(s).

In one embodiment, a fifth field is one of the X1 first-type field(s), the fifth information sub-block comprises the fifth field, and the fifth field indicates that the fifth information sub-block comprises either a characteristic sequence identifier of the X0 characteristic sequence identifier(s) or the Backoff Indicator (BI).

In one embodiment, a fifth field is one of the X1 first-type field(s), and the fifth information sub-block comprises the fifth field, if the fifth field is set to 0, the fifth information sub-block comprises the BI; if the fifth field is set to 1, the fifth information sub-block comprises a characteristic sequence identifier of the X0 characteristic sequence identifier(s).

In one embodiment, the Type Field in the fifth information sub-block indicates whether the fifth information sub-block comprises the BI.

In one embodiment, if the Type Field in the fifth information sub-block is set to 0, the fifth information sub-block comprises the BI.

In one embodiment, if the Type Field in the fifth information sub-block is set to 1, the fifth information sub-block comprises a characteristic sequence identifier of the X0 characteristic sequence identifier(s).

Embodiment 8

Figure 8:
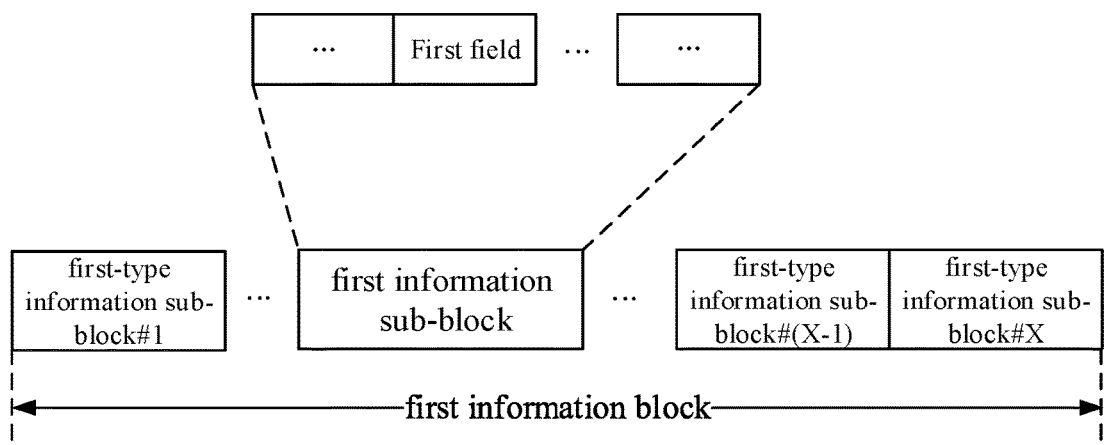
FIG. 8 illustrates a schematic diagram of relations between a first information sub-block, a first field and X first-type information sub-block(s) according to one embodiment of the present disclosure.

Embodiment 8 illustrates a schematic diagram of relations between a first information sub-block, a first field and X first-type information sub-block(s) according to one embodiment of the present disclosure, as shown in FIG. 8.

In Embodiment 8, the first information block comprises X first-type information sub-block(s), and the X first-type information sub-block(s) is(are respectively) used to determine the X characteristic sequence(s); a first information sub-block is one of the X first-type information sub-block(s); the first information sub-block is used to determine the first sequence; the first information sub-block comprises a first field, the first field being used to determine an information format of a second-type information sub-block of the X second-type information sub-block(s) that corresponds to the first sequence.

In one embodiment, the first information sub-block is a first-type information sub-block of the X first-type information sub-block(s), and the first information sub-block is used for determining the first sequence.

In one embodiment, the first information sub-block is used for determining the first sequence out of the X0 characteristic sequence(s).

In one embodiment, the first information sub-block comprises the first sequence identifier.

In one embodiment, a second information sub-block is one of the X second-type information sub-block(s) corresponding to the first sequence.

In one embodiment, the second information sub-block is one of the X second-type information sub-block(s) corresponding to the first sequence identifier.

In one embodiment, the second information sub-block is one of the X second-type information sub-block(s) corresponding to the first information sub-block.

In one embodiment, the first information sub-block comprises the first field, the first field being used to determine an information format of the second information sub-block.

In one embodiment, the first information sub-block also comprises a field other than the first field.

In one embodiment, the first field and a position of the first information sub-block in the X1 first-type information sub-blocks are jointly used to determine an information format of the second information sub-block.

In one embodiment, the first field is one of the X1 first-type field(s), and the first information sub-block is one of the X1 first-type information sub-block(s), if the first information sub-block is a first one of the X1 first-type information sub-block(s), the first field indicates whether the first information sub-block comprises the BI.

In one embodiment, the first field is one of the X1 first-type field(s), and the first information sub-block is one of the X1 first-type information sub-block(s), if the first information sub-block is not a first one of the X1 first-type information sub-block(s), the first field indicates an information format of the second information sub-block.

In one embodiment, the first field is one of the X1 first-type field(s), and the first information sub-block is one of the X1 first-type information sub-block(s), if the first information sub-block belongs to the X first-type information sub-block(s), the first field indicates an information format of the second information sub-block.

In one embodiment, the first field is the Type Field.

In one embodiment, the first field is not the Type Field.

In one embodiment, the first field comprises a reserved bit in the first information sub-block.

Embodiment 9

Figure 9:
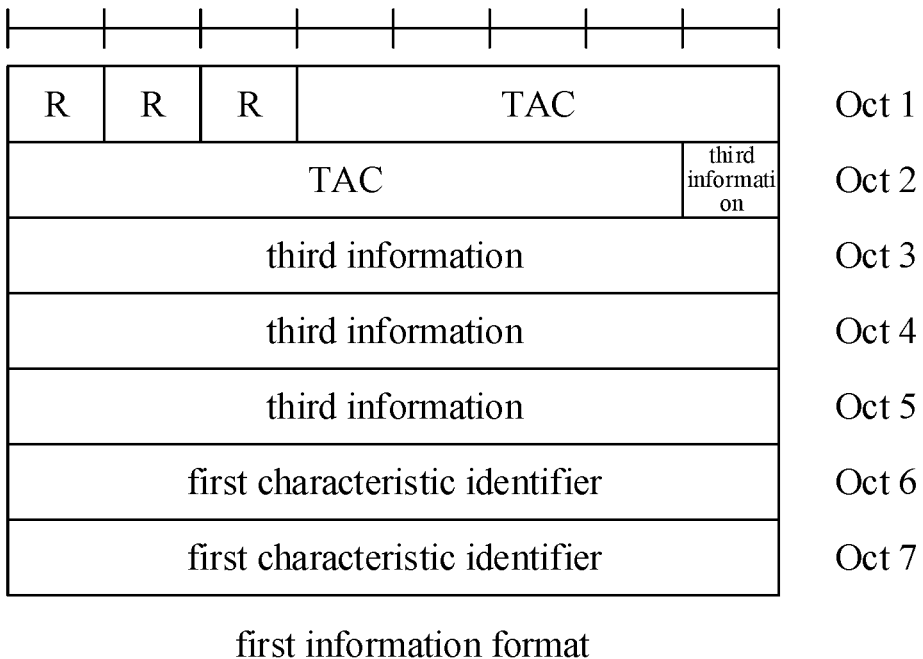
FIG. 9 illustrates a schematic diagram of an information format of a second-type information sub-block according to one embodiment of the present disclosure.
Figure 9:
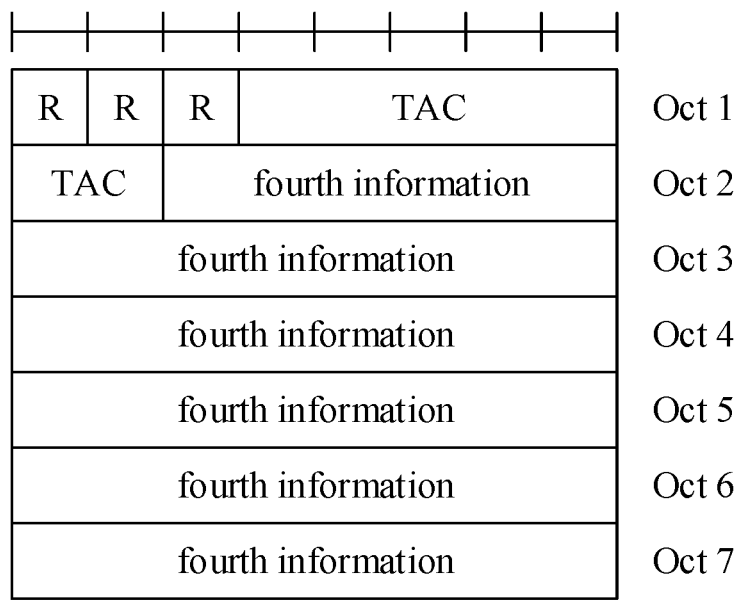

Embodiment 9 illustrates a schematic diagram of an information format of a second-type information sub-block according to one embodiment of the present disclosure, as shown in FIG. 9. In FIG. 9, the box marked by R represents a reserved bit, and the box marked by TAC refers to Timing Advance Command, both contained in a first-type information format #1.

In Embodiment 9, any of the X second-type information sub-block(s) in the present disclosure comprises a positive integer number of bit(s), and an information format of any of the X second-type information sub-block(s) is a first-type information format of a plurality of first-type information formats.

In one embodiment, N is equal to 2.

In one embodiment, the information format is used to determine a positive integer number of second-type field(s) comprised by any one second-type information sub-block.

In one embodiment, the information format is used to determine a positive integer number of second-type field(s) comprised by any one second-type information sub-block, as well as a number of bits comprised by any of the positive integer number of second-type field(s).

In one embodiment, a first information format is one of the N first-type information format(s), and the first information format comprises third information and a first characteristic identifier.

In one embodiment, a first information format is one of the N first-type information format(s), and the first information format comprises third information, not fourth information.

In one embodiment, a first information format is one of the N first-type information format(s), and the first information format comprises the third information and the first characteristic identifier, not fourth information.

In one embodiment, a first information format is one of the N first-type information format(s), and the first information format indicates that at least one of the X second-type information sub-block(s) corresponding to the first information format comprises the third information and the first characteristic identifier.

In one embodiment, a first information format is one of the N first-type information format(s), and the first information format indicates that at least one of the X second-type information sub-block(s) corresponding to the first information format comprises a reserved bit, a Timing Advance Command (TAC), the third information and the first characteristic identifier.

In one embodiment, a first information format is one of the N first-type information format(s), and the first information format indicates that at least one of the X second-type information sub-block(s) corresponding to the first information format comprises the third information and the first characteristic identifier, not the fourth information.

In one embodiment, a second information format is one of the N first-type information format(s), and the second information format comprises the fourth information.

In one embodiment, a second information format is one of the N first-type information format(s), and the second information format comprises the fourth information but not the third information.

In one embodiment, a second information format is one of the N first-type information format(s), and the second information format comprises a reserved bit, a TAC and the fourth information.

In one embodiment, a second information format is one of the N first-type information format(s), and the second information format comprises a reserved bit, a TAC, the fourth information and a first characteristic identifier.

In one embodiment, a second information format is one of the N first-type information format(s), and the second information format comprises a reserved bit, a TAC and a first characteristic identifier.

In one embodiment, a second information format is one of the N first-type information format(s), and the second information format comprises a reserved bit, a TAC and the fourth information but does not comprise the third information.

In one embodiment, a second information format is one of the N first-type information format(s), and the second information format indicates that at least one of the X second-type information sub-block(s) corresponding to the second information format comprises the fourth information.

In one embodiment, a second information format is one of the N first-type information format(s), and the second information format indicates that at least one of the X second-type information sub-block(s) corresponding to the second information format comprises the fourth information but does not comprise the third information.

In one embodiment, a second information format is one of the N first-type information format(s), and the second information format indicates that at least one of the X second-type information sub-block(s) corresponding to the second information format comprises the reserved bit, a TAC and the fourth information.

In one embodiment, a second information format is one of the N first-type information format(s), and the second information format indicates that at least one of the X second-type information sub-block(s) corresponding to the second information format comprises the reserved bit, a TAC, the fourth information and the first characteristic identifier.

In one embodiment, a second information format is one of the N first-type information format(s), and the second information format indicates that at least one of the X second-type information sub-block(s) corresponding to the second information format comprises the reserved bit, a TAC and the first characteristic identifier.

In one embodiment, a second information format is one of the N first-type information format(s), and the second information format indicates that at least one of the X second-type information sub-block(s) corresponding to the second information format comprises the reserved bit, a TAC and the fourth information, but not the third information.

In one embodiment, both the first information format and the second information format comprise a reserved bit.

In one embodiment, both the first information format and the second information format comprise a TAC.

In one embodiment, a number of bits occupied by the TAC comprised in the first information format is different from the occupied by the TAC comprised in the second information format.

In one embodiment, the third information is the UL Grant.

In one embodiment, the third information is the RAR uplink Grant.

In one embodiment, the fourth information is the UE Contention Resolution Identity.

In one embodiment, determining an information format of the second-type information sub-block of the X second-type information sub-block(s) that corresponds to the first sequence means determining a first-type information format from a positive integer number of first-type information format(s).

Embodiment 10

Embodiment 10 illustrates a schematic diagram of relations between a first field, a first information sub-block and a second information sub-block according to one embodiment of the present disclosure, as shown in FIG. 10. In FIG. 10, a slash-filled rectangle represents a first field in the present disclosure; as shown in Case A, the first field indicates the first information sub-block; as shown in Case B, the first field indicates the second information sub-block.

In Embodiment 10, the X1 first-type information sub-block(s) comprises(comprise) X1 first-type field(s) respectively, a first information sub-block is one of the X1 first-type information sub-block(s), and the first information sub-block comprises a first field, the first field being a first-type field of the X1 first-type field(s), a position of the first information sub-block in the X1 first-type information sub-block(s) is used to determine that the first field indicates the first information sub-block, or that the first field indicates the second information sub-block.

In one embodiment, the X first-type information sub-block(s) comprises(comprise) X first-type field(s) respectively, the X second-type information sub-block(s) corresponds(correspond) to the X first-type information sub-block(s) respectively, a first information sub-block is one of the X first-type information sub-block(s), and the first information sub-block comprises a first field, the first field being a first-type field of the X first-type field(s), a second information sub-block is one of the X second-type information sub-block(s) corresponding to the first information sub-block, and the first field is used to determine the information format of the second information sub-block.

In one embodiment, if the first information sub-block comprises the first sequence identifier, the second information sub-block corresponds to the first sequence.

In one embodiment, the first field comprises a positive integer number of bit(s).

In one embodiment, the first field comprises 1 bit.

In one embodiment, the first field is the Type Field in a MAC subheader.

In one embodiment, the X1 first-type information sub-block(s) comprises(comprise) X1 first-type field(s) respectively, a first information sub-block is one of the X1 first-type information sub-block(s), and the first information sub-block comprises a first field, the first field being a first-type field of the X1 first-type field(s), a position of the first information sub-block in the X1 first-type information sub-block(s) is used to determine analysis of the first field.

In one embodiment, the X1 first-type information sub-block(s) comprises(comprise) X1 first-type field(s) respectively, a first information sub-block is one of the X1 first-type information sub-block(s), and the first information sub-block comprises a first field, the first field being a first-type field of the X1 first-type field(s), a position of the first information sub-block in the X1 first-type information sub-block(s) is used to determine that the first field indicates whether the first information sub-block comprises fifth information, or the position of the first information sub-block in the X1 first-type information sub-block(s) is used to determine that the first field indicates an information format of a second information sub-block, the second information sub-block being one of the X second-type information sub-block(s) that corresponds to the first information sub-block.

In one embodiment, the X1 first-type information sub-blocks are sequentially arranged, if the first information sub-block is a first one of the X1 first-type information sub-blocks, the first field indicates whether the first specific information sub-block comprises the fifth information; if the first information sub-block isn't a first one of the X1 first-type information sub-blocks, the first field indicates the information format of the second specific information sub-block.

In one embodiment, the fifth information is the Backoff Indicator (BI).

In one embodiment, the fifth information is a characteristic sequence identifier of the X0 characteristic sequence identifier(s).

In one embodiment, the X1 first-type information sub-blocks are sequentially arranged, if the first information sub-block is a last one of the X1 first-type information sub-blocks, the first field indicates whether the first specific information sub-block comprises the fifth information; if the first information sub-block isn't a last one of the X1 first-type information sub-blocks, the first field indicates the information format of the second specific information sub-block.

In one embodiment, for a legitimate communication node, the first field is used to indicate an information format of a second information sub-block, the second information sub-block being one of the X second-type information sub-block(s) that corresponds to the first sequence.

In one embodiment, for an illegitimate communication node, the first field is used to indicate whether the first information sub-block comprises a first sequence identifier, the first sequence identifier is used to determine the first characteristic sequence, and the first characteristic sequence is one of the X characteristic sequence(s).

In one embodiment, the legitimate communication node refers to a UE that supports 3GPP Release-16 and later versions.

In one embodiment, the illegitimate communication node refers to a UE supporting 3GPP Release-15.

In one embodiment, the legitimate communication node refers to the UE supporting 2-step RACH.

In one embodiment, the illegitimate communication node refers to the UE not supporting 2-step RACH.

Embodiment 11

Embodiment 11 illustrates a schematic diagram of relations between a second field, a first signaling and a second information sub-block according to one embodiment of the present disclosure, as shown in FIG. 11. In FIG. 11, a rectangle filled with slashes represents a second field in the present disclosure.

In Embodiment 11, the first signaling comprises a second field, the second field being used to indicate an information format of a second-type information sub-block of the X second-type information block(s) corresponding to the first sequence.

In one embodiment, the first signaling comprises a second field, the second field being used to indicate an information format of the second information sub-block in the present disclosure.

In one embodiment, the second field comprises a positive integer number of bit(s).

In one embodiment, the second field comprises 1 bit.

In one embodiment, the second field is a field comprised by a piece of DCI.

In one embodiment, the second field is used along with the first field in the present disclosure for indicating an information format of a second-type information sub-block of the X second-type information block(s) corresponding to the first sequence.

In one embodiment, the second field is used along with the first field in the present disclosure for indicating an information format of the second information sub-block.

In one embodiment, only the second field is used to indicate an information format of a second-type information sub-block of the X second-type information block(s) corresponding to the first sequence.

In one embodiment, only the second field is used to indicate an information format of the second information sub-block.

In one embodiment, the second field indicates analyses of the first field.

In one embodiment, if the second field indicates that the first field indicates the information format of the second information sub-block, the first field is used for determining an information format of the second information sub-block out of the positive integer number of first-type information format(s).

In one embodiment, the first signaling comprises a first bit block, the first bit block comprising a positive integer number of sequentially arranged bits.

In one embodiment, the first bit block is bits comprised in a piece of DCI.

In one embodiment, the first bit block is bits other than a CRC bit comprised in a piece of DCI.

In one embodiment, a number of bits comprised by the first bit block is a payload size of the first signaling.

In one embodiment, a number of bits comprised by the first bit block is relevant to a format of the first signaling.

In one embodiment, the first signaling is obtained by the first bit block sequentially through channel coding, scrambling, modulation, and mapping to physical resources, baseband signal generation, and modulation and upconversion.

In one embodiment, the channel coding is based on a polar code.

In one embodiment, a first bit block is used for generating the first signaling, and the number of bits comprised by the first bit block is used to determine an information format of a second-type information sub-block of the X second-type information block(s) corresponding to the first sequence.

In one embodiment, a first bit block is used for generating the first signaling, and the number of bits comprised by the first bit block is used to determine an information format of the second information sub-block.

Embodiment 12

Embodiment 12 illustrates a schematic diagram of a relationship between a first information block and a second information block according to one embodiment of the present disclosure, as shown in FIG. 12.

In Embodiment 12, the first information block and the second information block in the present disclosure are arranged in sequence, namely, the X1 first-type information sub-block(s) comprised by the first information block and the X second-type information sub-block(s) comprised by the second information block are sequentially arranged, as illustrated in Case A of FIG. 12.

In one embodiment, the X1 first-type information sub-blocks are sequentially arranged, which means any one of the X1 first-type information sub-blocks is adjacent to the other one of the X1 first-type information sub-blocks.

In Embodiment 12, the first information block and the second information block in the present disclosure are arranged in an interlaced manner, namely, the X first-type information sub-block(s) comprised by the first information block and the X second-type information sub-block(s) comprised by the second information block are alternately arranged, and the X first-type information sub-block(s) and the X second-type information sub-block(s) respectively compose X first-type information group(s), as illustrated in Case B of FIG. 12.

In one embodiment, any of the X first-type information sub-block(s) is adjacent to one of the X second-type information sub-block(s) corresponding to the first-type information sub-block.

In one embodiment, the second radio signal comprises X first-type information group(s), and any one of the X first-type information group(s) comprises one of the X first-type information sub-block(s) and one of the X second-type information sub-block(s).

In one embodiment, a first-type information sub-block comprised by any of the X first-type information group(s) corresponds to a second-type information sub-block.

In one embodiment, the X first-type information group(s) is(are respectively) X MAC subPDU(s).

Embodiment 13

Figure 13:
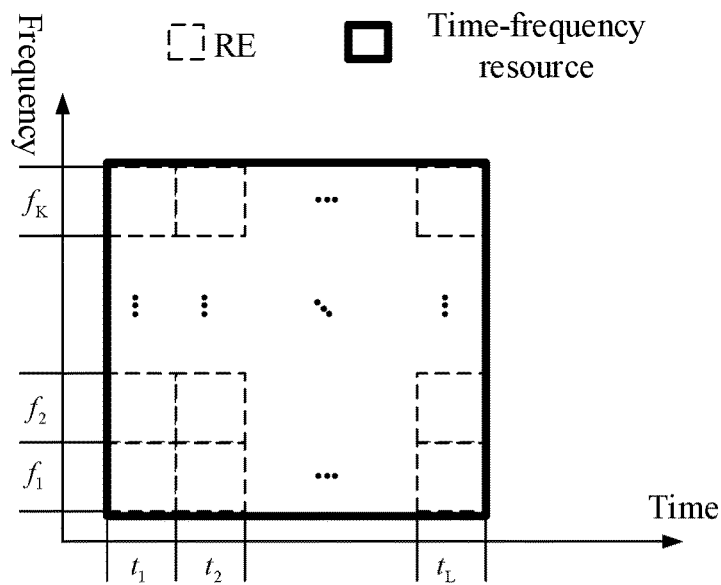
FIG. 13 illustrates a schematic diagram of a time-frequency resource according to one embodiment of the present disclosure.

Embodiment 13 illustrates a schematic diagram of a time-frequency resource according to one embodiment of the present disclosure, as shown in FIG. 13. In FIG. 13, a small dotted-line framed box represents a Resource Element (RE), and the large thick-line box represents a time-frequency resource. In FIG. 13, a time-frequency resource occupies K subcarriers in frequency domain and L multicarrier symbols in time domain, K and L both being positive integers. As illustrated in FIG. 13, $t_1$, $t_2$ . . . , and $t_L$ are the L multicarrier symbols, while $f_1$, $f_2$ . . . , and $f_K$ are the K subcarriers.

In Embodiment 13, a time-frequency resource occupies K subcarriers in frequency domain and L multicarrier symbols in time domain, K and L both being positive integers.

In one embodiment, K is equal to 12.

In one embodiment, K is equal to 72.

In one embodiment, K is equal to 127.

In one embodiment, K is equal to 240.

In one embodiment, L is equal to 1.

In one embodiment, L is equal to 2.

In one embodiment, L is no greater than 14.

In one embodiment, any multicarrier symbol of the L multicarrier symbols at least is one of a Frequency Division Multiple Access (FDMA) symbol, an Orthogonal Frequency Division Multiplexing (OFDM) symbol, a Single-Carrier Frequency Division Multiple Access (SC-FDMA) symbol, a Discrete Fourier Transform Spread Orthogonal Frequency Division Multiplexing (DFTS-OFDM) symbol, a Filter Bank Multi-Carrier (FBMC) symbol or an Interleaved Frequency Division Multiple Access (IFDMA) symbol.

In one embodiment, the time-domain resource comprises a positive integer number of Radio Frame(s).

In one embodiment, the time-domain resource is a Radio Frame.

In one embodiment, the time-domain resource comprises a positive integer number of Subframe(s).

In one embodiment, the time-domain resource is a Subframe.

In one embodiment, the time-domain resource comprises a positive integer number of Slot(s).

In one embodiment, the time-domain resource is a Slot.

In one embodiment, the time-domain resource comprises a positive integer number of multicarrier symbol(s).

In one embodiment, the time-domain resource is a multicarrier symbol.

In one embodiment, the frequency-domain resource comprises a positive integer number of Carrier(s).

In one embodiment, the frequency-domain resource is a Carrier.

In one embodiment, the frequency-domain resource comprises a positive integer number of Bandwidth Part(s) (BWP(s)).

In one embodiment, the frequency-domain resource is a BWP.

In one embodiment, the frequency-domain resource comprises a positive integer number of Subchannel(s).

In one embodiment, the frequency-domain resource is a Subchannel.

In one embodiment, the subchannel comprises a positive integer number of Resource Block(s) (RB(s)).

In one embodiment, the number of RB(s) comprised by the subchannel is variable.

In one embodiment, the RB comprises a positive integer number of subcarrier(s) in frequency domain.

In one embodiment, the RB comprises 12 subcarriers in frequency domain.

In one embodiment, the subchannel comprises a positive integer number of PRB(s).

In one embodiment, the number of PRB(s) comprised by the subchannel is variable.

In one embodiment, the PRB comprises a positive integer number of subcarrier(s) in frequency domain.

In one embodiment, the PRB comprises 12 subcarriers in frequency domain.

In one embodiment, the frequency-domain resource comprises a positive integer number of RB(s).

In one embodiment, the frequency-domain resource is an RB.

In one embodiment, the frequency-domain resource comprises a positive integer number of PRB(s).

In one embodiment, the frequency-domain resource is a PRB.

In one embodiment, the frequency-domain resource comprises a positive integer number of subcarrier(s).

In one embodiment, the frequency-domain resource is a subcarrier.

In one embodiment, the time-frequency resource comprises R RE(s), R being a positive integer.

In one embodiment, the time-frequency resource is composed of R RE(s), R being a positive integer.

In one embodiment, any of the R RE(s) occupies a multicarrier symbol in time domain and a subcarrier in frequency domain.

In one embodiment, an SCS of the RE is measured in Hertz (Hz).

In one embodiment, an SCS of the RE is measured in Kilohertz (kHz).

In one embodiment, an SCS of the RE is measured in Megahertz (MHz).

In one embodiment, a length of multicarrier symbol of the RE is measured in sampling points.

In one embodiment, a length of multicarrier symbol of the RE is measured in microseconds (s).

In one embodiment, a length of multicarrier symbol of the RE is measured in milliseconds (ms).

In one embodiment, an SCS of the RE is at least one of 1.25 kHz, 2.5 kHz, 5 kHz, 15 kHz, 30 kHz, 60 kHz, 120 kHz or 240 kHz.

In one embodiment, the time-frequency resource comprises the K subcarriers and the L multicarrier symbols, a product of K and L being no less than the R.

In one embodiment, the time-frequency resource does not comprise any RE allocated to a Guard Period (GP).

In one embodiment, the time-frequency resource does not comprise any RE allocated to a Reference Signal (RS).

In one embodiment, the time-frequency resource does not comprise any RE allocated to the first-type signal in the present disclosure.

In one embodiment, the time-frequency resource does not comprise any RE allocated to the first-type channel in the present disclosure.

In one embodiment, the time-frequency resource does not comprise any RE allocated to the second-type signal in the present disclosure.

In one embodiment, the time-frequency resource does not comprise any RE allocated to the second-type channel in the present disclosure.

In one embodiment, the time-frequency resource comprises a positive integer number of RB(s).

In one embodiment, the time-frequency resource belongs to an RB.

In one embodiment, the time-frequency resource is equivalent to an RB in frequency domain.

In one embodiment, the time-frequency resource comprises 6 RBs in frequency domain.

In one embodiment, the time-frequency resource comprises 20 RBs in frequency domain.

In one embodiment, the time-frequency resource comprises a positive integer number of PRB(s).

In one embodiment, the time-frequency resource belongs to a PRB.

In one embodiment, the time-frequency resource is equivalent to a PRB in frequency domain.

In one embodiment, the time-frequency resource comprises a positive integer number of Virtual Resource Block(s) (VRB(s)).

In one embodiment, the time-frequency resource belongs to a VRB.

In one embodiment, the time-frequency resource is equivalent to a VRB in frequency domain.

In one embodiment, the time-frequency resource comprises a positive integer number of Physical Resource Block pair(s) (PRB pair(s)).

In one embodiment, the time-frequency resource belongs to a PRB pair.

In one embodiment, the time-frequency resource is equivalent to a PRB pair in frequency domain.

In one embodiment, the time-frequency resource comprises a positive integer number of Radio Frame(s).

In one embodiment, the time-frequency resource belongs to a Radio Frame.

In one embodiment, the time-frequency resource is equivalent to a Radio Frame in time domain.

In one embodiment, the time-frequency resource comprises a positive integer number of subframe(s).

In one embodiment, the time-frequency resource belongs to a subframe.

In one embodiment, the time-frequency resource is equivalent to a subframe in time domain.

In one embodiment, the time-frequency resource comprises a positive integer number of slot(s).

In one embodiment, the time-frequency resource belongs to a slot.

In one embodiment, the time-frequency resource is equivalent to a slot in time domain.

In one embodiment, the time-frequency resource comprises a positive integer number of symbol(s).

In one embodiment, the time-frequency resource belongs to a symbol.

In one embodiment, the time-frequency resource is equivalent to a symbol in time domain.

In one embodiment, the time-frequency resource belongs to the third-type signal in the present disclosure.

In one embodiment, the time-frequency resource belongs to the third-type channel in the present disclosure.

In one embodiment, a duration of the time-domain resource in the present disclosure lasts as long as a time-domain duration of the time-frequency resource in the present disclosure.

Embodiment 14

Figure 14:
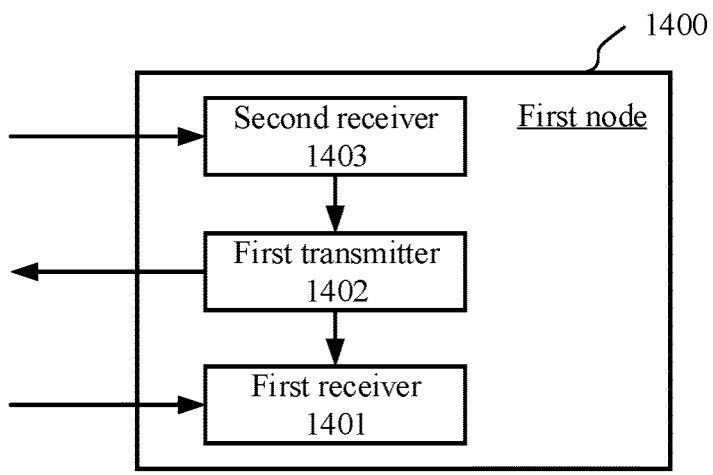
FIG. 14 illustrates a structure block diagram of a processing device used in a first node according to one embodiment of the present disclosure.

Embodiment 14 illustrates a structure block diagram of a processing device used in a first node, as shown in FIG. 14. In Embodiment 14, a processing device 1400 in a first node is mainly composed of a first receiver 1401, a first transmitter 1402 and a second receiver 1403.

In one embodiment, the first receiver 1401 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1402 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the second receiver 1403 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In Embodiment 14, the first transmitter 1402 transmits a first sequence and a first radio signal, the first sequence being used to determine a time-frequency resource occupied by the first radio signal; the first receiver 1401 receives a first signaling; and the first receiver 1401 receives a second radio signal, the first signaling being used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the second receiver 1403 receives a third information block; the third information block is used to determine a time length of a first time window; a time-domain resource occupied by the first signaling belongs to the first time window, at least one of a radio resource occupied by the first sequence or a radio resource occupied by the first radio signal is used to determine a start of the first time window.

In one embodiment, the first information block comprises X first-type information sub-block(s), and the X first-type information sub-block(s) is(are respectively) used to determine the X characteristic sequence(s); a first information sub-block is one of the X first-type information sub-block(s); the first information sub-block is used to determine the first sequence; the first information sub-block comprises a first field, the first field being used to determine an information format of a second-type information sub-block of the X second-type information sub-block(s) that corresponds to the first sequence.

In one embodiment, for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the at least one characteristic sequence.

In one embodiment, the first signaling comprises a second field, the second field being used to indicate an information format of a second-type information sub-block of the X second-type information sub-block(s) that corresponds to the first sequence; or, a first bit block is used to generate the first signaling, and the number of bits comprised in the first bit block is used to determine an information format of a second-type information sub-block of the X second-type information sub-block(s) that corresponds to the first sequence.

In one embodiment, a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block.

In one embodiment, the first node's processing device 1400 is a UE.

In one embodiment, the first node's processing device 1400 is a relay node.

Embodiment 15

Figure 15:
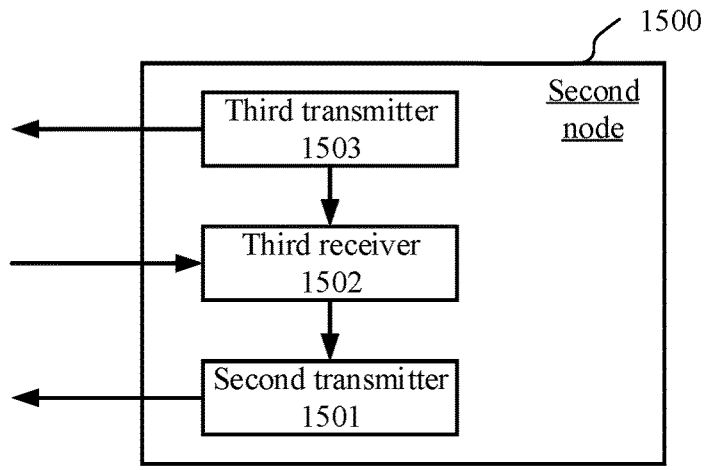
FIG. 15 illustrates a structure block diagram of a processing device used in a second node according to one embodiment of the present disclosure.

Embodiment 15 illustrates a structure block diagram of a processing device used in a second node, as shown in FIG. 15. In FIG. 15, a processing device 1500 in a second node is mainly composed of a second transmitter 1501, a third receiver 1502 and a third transmitter 1503.

In one embodiment, the second transmitter 1501 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the third receiver 1502 comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the third transmitter 1503 comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 15, the third receiver 1502 receives a first sequence and a first radio signal, the first sequence being used to determine a time-frequency resource occupied by the first radio signal; the second transmitter 1501 transmits a first signaling; and the second transmitter 1501 transmits a second radio signal, the first signaling being used to determine at least one of a time-frequency resource occupied by the second radio signal or a Modulation and Coding Scheme (MCS) adopted by the second radio signal; the second radio signal carries a first information block and a second information block, the first information block being used to determine X characteristic sequence(s), X being a positive integer; the second information block comprises X second-type information sub-block(s), and the X second-type information sub-block(s) corresponds(correspond) to the X characteristic sequence(s) respectively; if the first sequence is one of the X characteristic sequence(s), at least one of the first signaling or the first information block is used to determine an information format of a second-type information sub-block of the X second-type information sub-block(s) that corresponds to the first sequence.

In one embodiment, the third transmitter 1503 transmits a third information block; the third information block is used to determine a time length of a first time window; a time-domain resource occupied by the first signaling belongs to the first time window, at least one of a radio resource occupied by the first sequence or a radio resource occupied by the first radio signal is used to determine a start of the first time window.

In one embodiment, the first information block comprises X first-type information sub-block(s), and the X first-type information sub-block(s) is(are respectively) used to determine the X characteristic sequence(s); a first information sub-block is one of the X first-type information sub-block(s); the first information sub-block is used to determine the first sequence; the first information sub-block comprises a first field, the first field being used to determine an information format of a second-type information sub-block of the X second-type information sub-block(s) that corresponds to the first sequence.

In one embodiment, for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the at least one characteristic sequence.

In one embodiment, the first signaling comprises a second field, the second field being used to indicate an information format of a second-type information sub-block of the X second-type information sub-block(s) that corresponds to the first sequence; or, a first bit block is used to generate the first signaling, and the number of bits comprised in the first bit block is used to determine an information format of a second-type information sub-block of the X second-type information sub-block(s) that corresponds to the first sequence.

In one embodiment, a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block.

In one embodiment, the second node's processing device 1500 is a base station.

In one embodiment, the second node's processing device 1500 is a relay node.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A method in a User Equipment for wireless communications, comprising:
   transmitting a first sequence and a first radio signal, the first sequence being used to determine a time-frequency resource occupied by the first radio signal;
   receiving a first signaling; and
   receiving a second radio signal, the first signaling being used to determine at least one of a time-frequency resource occupied by the second radio signal or a Modulation and Coding Scheme (MCS) adopted by the second radio signal;
   wherein the first sequence and the first radio signal are respectively transmitted on a PRACH and a PUSCH; the first sequence is identified by a Random Access Preamble Identifier (RAPID), and the first sequence is used to determine a scrambling sequence of the first radio signal; the first signaling and the second radio signal are respectively transmitted on a PDCCH and a PDSCH; the first signaling comprises a second field, the second field comprising at least one bit; the second radio signal carries a first information block and a second information block, the first information block comprises X first-type information sub-block(s), and a first information sub-block is one of the X first-type information sub-block(s), the first information sub-block comprising a first field; the first information block is used to determine X characteristic sequence(s), X being a positive integer; the second information block comprises X second-type information sub-block(s), and the X first-type information sub-block(s) corresponds(correspond) to X second-type information sub-block(s) respectively; the first sequence is one of the X characteristic sequence(s), and the second field and the first field are jointly used to indicate an information format of a second-type information sub-block of the X second-type information sub-block(s) that corresponds to the first sequence; any of the X first-type information sub-block(s) comprises one MAC subheader, and at least one of the X second-type information sub-block(s) comprises a MAC payload; a candidate of the information format of the second-type information sub-block is a second information format; the second information format comprises a reserved bit, a Timing Advance Command (TAC) and UE Contention Resolution Identity, but does not comprise an Uplink Grant.

2. The method according to claim 1, wherein a time-frequency resource occupied by the first sequence is used to determine a second characteristic identifier, and the second characteristic identifier is used to generate a scrambling sequence of the first signaling.

3. The method according to claim 2, wherein a first characteristic identifier and the second characteristic identifier are two different RNTIs respectively; the first characteristic identifier is a C-RNTI, and the first radio signal comprises the first characteristic identifier; or, the first characteristic identifier is a TC-RNTI, and the second radio signal comprises the first characteristic identifier; or, the first characteristic identifier is a RA-RNTI, and the first characteristic identifier is used to generate a scrambling sequence of the first radio signal.

4. The method according to claim 1, wherein there is at least one random access occasion, and for one of the at least one occasion, there is at least one characteristic sequence; a first characteristic identifier is used to determine the first sequence out of the at least one characteristic sequence; the first characteristic identifier is used to generate a scrambling sequence of the first radio signal.

5. The method according to claim 2, wherein an information format of any of the X second-type information sub-block(s) is a first-type information format of a plurality of first-type information formats; a first information format and a second information format are respectively first-type information formats of the plurality of first-type information formats; when the second field indicates that the first field indicates an information format of the second information sub-block, the first field is used to determine the information format of the second information sub-block out of the plurality of first-type information formats.

6. The method according to claim 5, wherein a first bit block comprises a plurality of sequentially arranged bits, and the first signaling is obtained by the first bit block sequentially through Channel Coding, Scrambling, Modulation, Mapping to Physical Resources, Baseband Signal Generation, and Modulation and Upconversion, of which the Channel Coding is based on a polar code.

7. The method according to claim 6, comprising:
receiving a third information block;
wherein the third information block is used to determine a time length of a first time window; a time-domain resource occupied by the first signaling belongs to the first time window, at least one of a radio resource occupied by the first sequence or a radio resource occupied by the first radio signal is used to determine a start of the first time window.

8. The method according to claim 7, wherein for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the at least one characteristic sequence.

9. The method according to claim 7, wherein a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block, the first characteristic identifier being a RA-RNTI.

10. A User Equipment for wireless communications, comprising:
a first transmitter, transmitting a first sequence and a first radio signal, the first sequence being used to determine a time-frequency resource occupied by the first radio signal; and
a first receiver, receiving a first signaling;
the first receiver, receiving a second radio signal, the first signaling being used to determine at least one of a time-frequency resource occupied by the second radio signal or a Modulation and Coding Scheme (MCS) adopted by the second radio signal;
the first sequence and the first radio signal are respectively transmitted on a PRACH and a PUSCH; the first sequence is identified by a Random Access Preamble Identifier (RAPID), and the first sequence is used to determine a scrambling sequence of the first radio signal; the first signaling and the second radio signal are respectively transmitted on a PDCCH and a PDSCH;
the first signaling comprises a second field, the second field comprising at least one bit; the second radio signal carries a first information block and a second information block, the first information block comprises X first-type information sub-block(s), and a first information sub-block is one of the X first-type information sub-block(s), the first information sub-block comprising a first field; the first information block is used to determine X characteristic sequence(s), X being a positive integer; the second information block comprises X second-type information sub-block(s), and the X first-type information sub-block(s) corresponds(correspond) to X second-type information sub-block(s) respectively; the first sequence is one of the X characteristic sequence(s), and the second field and the first field are jointly used to indicate an information format of a second-type information sub-block of the X second-type information sub-block(s) that corresponds to the first sequence; any of the X first-type information sub-block(s) comprises one MAC subheader, and at least one of the X second-type information sub-block(s) comprises a MAC payload; a candidate of the information format of the second-type information sub-block is a second information format; the second information format comprises a reserved bit, a Timing Advance Command (TAC) and UE Contention Resolution Identity, but does not comprise an Uplink Grant.

11. The User Equipment according to claim 10, wherein a time-frequency resource occupied by the first sequence is used to determine a second characteristic identifier, and the second characteristic identifier is used to generate a scrambling sequence of the first signaling.

12. The User Equipment according to claim 11, wherein a first characteristic identifier and the second characteristic identifier are two different RNTIs respectively; the first characteristic identifier is a C-RNTI, and the first radio signal comprises the first characteristic identifier; or, the first characteristic identifier is a TC-RNTI, and the second radio signal comprises the first characteristic identifier; or, the first characteristic identifier is a RA-RNTI, and the first characteristic identifier is used to generate a scrambling sequence of the first radio signal.

13. The User Equipment according to claim 10, wherein there is at least one random access occasion, and for one of the at least one occasion, there is at least one characteristic sequence; a first characteristic identifier is used to determine the first sequence out of the at least one characteristic sequence; the first characteristic identifier is used to generate a scrambling sequence of the first radio signal.

14. The User Equipment according to claim 11, wherein an information format of any of the X second-type information sub-block(s) is a first-type information format of a plurality of first-type information formats; a first information format and a second information format are respectively first-type information formats of the plurality of first-type information formats; the first information format indicates that at least one of the X second-type information sub-block(s) corresponding to the first information format comprises a reserved bit, a Tracking Area Code (TAC), Uplink Grant and a first characteristic identifier; the second information format indicates that at least one of the X second-type information sub-block(s) corresponding to the first information format comprises a reserved bit, a TAC and a UE Contention Resolution Identity.

15. The User Equipment according to claim 14, wherein when the second field indicates that the first field indicates an information format of the second information sub-block, and the first field is used to determine the information format of the second information sub-block out of the N first-type information format(s).

16. The User Equipment according to claim 14, wherein a first bit block comprises a plurality of sequentially arranged bits, and the first signaling is obtained by the first bit block sequentially through Channel Coding, Scrambling, Modulation, Mapping to Physical Resources, Baseband Signal Generation, and Modulation and Upconversion, of which the Channel Coding is based on a polar code.

17. The User Equipment according to claim 16, comprising:
a second receiver, receiving a third information block;
wherein the third information block is used to determine a time length of a first time window; a time-domain resource occupied by the first signaling belongs to the first time window, at least one of a radio resource occupied by the first sequence or a radio resource occupied by the first radio signal is used to determine a start of the first time window.

18. The User Equipment according to claim 13, wherein for a legitimate communication node, the first field is used to indicate an information format of a second information sub-block, the second information sub-block being one of the X second-type information sub-block(s) that corresponds to the first sequence; for an illegitimate communication node, the first field is used to indicate whether the first information sub-block comprises a first sequence identifier, the first sequence identifier is used to determine a first characteristic sequence, and the first characteristic sequence is one of the X characteristic sequence(s).

19. The User Equipment according to claim 17, wherein a second bit block is used to generate the first radio signal, and the second bit block comprises a plurality of bits, a third bit block is used to generate the second radio signal, and the third bit block comprises a plurality of bits; a time-frequency resource occupied by the first sequence is used to determine a first characteristic identifier, the first characteristic identifier is used to determine an initial value of a generator of a scrambling sequence of the second bit block, and the first characteristic identifier is used to determine an initial value of a generator of a scrambling sequence of the third bit block, the first characteristic identifier being a RA-RNTI.

20. A base station for wireless communication, comprising:
  a third receiver, receiving a first sequence and a first radio signal, the first sequence being used to determine a time-frequency resource occupied by the first radio signal; and
  a second transmitter, transmitting a first signaling;
  the second transmitter, transmitting a second radio signal, the first signaling being used to determine at least one of a time-frequency resource occupied by the second radio signal or a Modulation and Coding Scheme (MCS) adopted by the second radio signal;
  wherein the first sequence and the first radio signal are respectively transmitted on a PRACH and a PUSCH; the first sequence is identified by a Random Access Preamble Identifier (RAPID), and the first sequence is used to determine a scrambling sequence of the first radio signal; the first signaling and the second radio signal are respectively transmitted on a PDCCH and a PDSCH; the first signaling comprises a second field, the second field comprising at least one bit; the second radio signal carries a first information block and a second information block, the first information block comprises X first-type information sub-block(s), and a first information sub-block is one of the X first-type information sub-block(s), the first information sub-block comprising a first field; the first information block is used to determine X characteristic sequence(s), X being a positive integer; the second information block comprises X second-type information sub-block(s), and the X first-type information sub-block(s) corresponds(correspond) to X second-type information sub-block(s) respectively; the first sequence is one of the X characteristic sequence(s), and the second field and the first field are jointly used to indicate an information format of a second-type information sub-block of the X second-type information sub-block(s) that corresponds to the first sequence; any of the X first-type information sub-block(s) comprises one MAC subheader, and at least one of the X second-type information sub-block(s) comprises a MAC payload; a candidate of the information format of the second-type information sub-block is a second information format; the second information format comprises a reserved bit, a Timing Advance Command (TAC) and UE Contention Resolution Identity, but does not comprise an Uplink Grant.

* * * * *